(12) United States Patent
Kawase

(10) Patent No.: US 7,090,950 B2
(45) Date of Patent: *Aug. 15, 2006

(54) COLOR FILTER, METHOD FOR MAKING COLOR FILTER, LIQUID CRYSTAL DEVICE, METHOD FOR MAKING LIQUID CRYSTAL DEVICE, AND ELECTRONIC APPARATUS

(75) Inventor: Tomomi Kawase, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/005,044

(22) Filed: Dec. 7, 2004

(65) Prior Publication Data

US 2005/0084777 A1 Apr. 21, 2005

Related U.S. Application Data

(62) Division of application No. 10/314,130, filed on Dec. 9, 2002, now Pat. No. 6,861,184.

(30) Foreign Application Priority Data

Dec. 17, 2001 (JP) ............................. 2001-383020

(51) Int. Cl.
*G02B 5/20* (2006.01)
*G02F 1/1335* (2006.01)

(52) U.S. Cl. ........................... 430/7; 347/106; 349/114

(58) Field of Classification Search ................... 430/7; 349/106, 113, 114; 347/106
See application file for complete search history.

(56) References Cited

U.S. PATENT DOCUMENTS 5,948,577 A 9/1999 Nakazawa et al.
6,690,448 B1 2/2004 Kawase et al.
6,697,135 B1 2/2004 Baek et al.
6,861,184 B1 * 3/2005 Kawase .................... 430/7

FOREIGN PATENT DOCUMENTS

| CN | 1153309 | 7/1997 |
|---|---|---|
| EP | 0724169 A1 | 7/1996 |
| JP | A 2000-089023 | 3/2000 |
| JP | A 2000-267081 | 9/2000 |
| JP | 2001-91938 | 4/2001 |
| JP | A 2001-166289 | 6/2001 |
| JP | A 2001-235613 | 8/2001 |
| JP | A 2002-341128 | 11/2002 |
| JP | A 2002-350843 | 12/2002 |
| JP | A 2003-057433 | 2/2003 |
| JP | A 2003-185831 | 7/2003 |

* cited by examiner

*Primary Examiner*—John A. McPherson
(74) *Attorney, Agent, or Firm*—Oliff & Berridge, PLC

(57) ABSTRACT

The invention makes it possible to adjust the color appearance for each display unit, e.g., each dot, in a color display obtained by using a color filter. A color filter includes a plurality of dot-shaped color films provided on a substrate. At least one of the dot-shaped color films includes a first film and a second film having different color properties, the second film being deposited on the first film. The thickness ratio of the first film to the second film changes within one dot-shaped color film. Alternatively, a first film and a second film may be formed so as to be adjacent to each other in one dot-shaped color film and in such a way that the first film and the second film have different color properties.

20 Claims, 17 Drawing Sheets

(a)

(b)

COLOR FILTER, METHOD FOR MAKING COLOR FILTER, LIQUID CRYSTAL DEVICE, METHOD FOR MAKING LIQUID CRYSTAL DEVICE, AND ELECTRONIC APPARATUS

This is a Division of application Ser. No. 10/314,130 filed Dec. 9, 2002, now U.S. Pat. No. 6,861,184. The entire disclosure of the prior application is hereby incorporated by reference herein in its entirety.

BACKGROUND

The present invention relates to a color filter including a plurality of color films provided on a substrate and a method for making the same. The present invention also relates to a liquid crystal device including the color filter and a method for making the same. The present invention further relates to an electronic apparatus including the liquid crystal device.

Liquid crystal devices are currently widely used for electronic apparatuses, such as mobile phones, mobile information terminals, wristwatches, and mobile computers. For example, the liquid crystal devices are used as display sections to display images, such as text, numerals, and graphics. Many liquid crystal devices perform full color display, and in such cases, color filters are included in the liquid crystal devices.

In general, in the color filters, color films of the individual colors, such as the additive primary colors, red (R), green (G), and blue (B), are arranged in a predetermined pattern, for example, a striped pattern, a delta pattern, or a mosaic pattern.

With respect to the display mode of the liquid crystal device, the related art includes a reflective display using external light, such as sunlight or indoor light, and a transmissive display using an illumination unit as a backlight. The related art also includes so-called "transflective displays" in which either reflective display or transmissive display is selected as required.

In the liquid crystal device which performs transflective display, for example, a reflective layer to reflect external light is provided in the device, and openings are formed in the reflective layer or the reflective layer is formed thinly so that light emitted by a backlight or the like is transmitted through the reflective layer.

When reflective display is performed, external light is reflected by the reflective layer and supplied to the liquid crystal layer, and when transmissive display is performed, light from the backlight or the like is transmitted through the reflective layer and supplied to the liquid crystal layer. When color display is performed using a color filter, light before being supplied to the liquid crystal layer or light after being transmitted though the liquid crystal layer passes through the color filter, and the light in the appropriate wavelength range is selected to perform color display.

SUMMARY

In the related art liquid crystal device, when reflective display is performed, light before being supplied to the liquid crystal layer or light after being supplied to the liquid crystal layer makes a round trip through the color filter, i.e., it passes through the color filter twice. When transmissive display is performed, light before being supplied to the liquid crystal layer or light after being supplied to the liquid crystal layer passes the color filter once. That is, there is a difference in the optical path length of the light passing through the color filter between the reflective display mode and the transmissive display mode.

As described above, in the related art liquid crystal device, since there is a difference in the optical path length of the light passing through the color filter between the reflective display mode and the transmissive display mode, color is perceived differently by the viewer in the reflective display mode as opposed to in the transmissive display mode, thus producing an unnatural image.

On the assumption that the color appearance is determined by the combination of the three properties of color, i.e., hue (H), value (V), and chroma (C), the combination of the three properties of color in the reflective display mode is considered to be different from that in the transmissive display mode, resulting in the variations in the perception of color by the viewer.

Specifically, in the reflective display mode, since the optical path of the light passing through the color filter is long, the value is decreased. In the transmissive display, since the optical path of the light passing through the color filter is short, the chroma is decreased, resulting in a difference in color appearance.

The color filter has the property of changing the wavelength distribution of light passing therethrough, and light density is the concept which quantitatively indicates this property. The light density is considered to be the capability of the color film for changing the wavelength distribution of light per unit thickness. As the light density increases, the chroma of transmitted light becomes strong, and as the light density is decreased, the chroma of transmitted light becomes weak.

In general, a color film of the color filter is formed using a material in which a coloring agent composed of a pigment, a dye, a natural pigment, or the like is dissolved in an appropriate solvent. The light density can be changed by changing the quantity of the coloring agent in the film material. Consequently, by changing the quantity of the coloring agent in the film material, the color appearance during color display can be changed. Although it has been possible to adjust the color appearance in the transflective liquid crystal device using the principle described above, it has been difficult to obtain the desired color appearance simultaneously in the reflective display mode, and in the transmissive display mode.

The reason for the problems of the transflective liquid crystal device in the case of color display is that the color film has the same color density in the reflective mode and in the transmissive mode, although the optical path length of light passing through the color film in the reflective mode differs from the optical path length of light passing through the color film in the transmissive mode. If the light densities can be set at appropriate values in the reflective mode and in the transmissive mode, respectively, uniform color appearance can be attained for reflection and transmission. In such a case, in one display unit in the color filter, for example, in one dot or in one pixel, the light density in a region corresponding to the optical path during reflection must be set differently from that in a region corresponding to the optical path during transmission.

In addition to the color filter used for the transflective liquid crystal device, with respect to a commonly used color filter, it may be desired that the light density of the color film be partially changed in one dot or in one pixel.

The present invention addresses the problem described above, and adjusts the color appearance for each display unit in a color display obtained by using a color filter.

(1) In order to address or attain the object described above, a color filter of the present invention includes a plurality of dot-shaped color films formed on a substrate. At least one of the dot-shaped color films are laminated with a first film and a second film having different color properties, and the thickness ratio of the first film to the second film changes within one dot-shaped color film.

When color display is performed using the color filter having the structure described above, light transmitted through the individual dot-shaped color films is observed by the viewer. At this stage, the color appearance is determined by the thickness ratio of the first film to the second film in each dot-shaped color film. For example, if the thickness of the first film is larger than the thickness of the second film, the color appearance is greatly influenced by the color property of the first film. If the thickness of the second film is larger than the thickness of the first film, the color appearance is greatly influenced by the color property of the second film. As described above, in the color filter having the structure described above, the color appearance can be adjusted for each display unit in the color display obtained by the color filter.

(2) In the color filter having the structure described above, a reflective layer may be provided on the substrate or separately from the substrate, and openings may be formed in the reflective layer in the regions corresponding to each of the dot-shaped color films. There may be a difference in the thickness ratio of the first film to the second film between the region corresponding to the opening and the region corresponding to the reflective layer.

In the structure described above, the description of "a reflective layer is provided on the substrate" means that the reflective layer is provided on the substrate on which the color filter is formed. On the other hand, the description of "a reflective layer is provided separately from the substrate" means that, for example, the reflective layer is provided on another substrate which faces the substrate on which the color filter is formed.

In the color filter having the structure described above, within the one dot-shaped color film, it is possible to set different thickness ratios of the first film to the second film for the optical path of the light reflected by the reflective layer and for the optical path of the light transmitted through the opening. The light reflected by the reflective layer makes a round trip through the color film, i.e., it passes through the color film twice, whereas the light transmitted through the opening passes through the color film once. With respect to the light passing through the color film twice, although the value tends to be insufficient, if the thickness ratio in the optical path of the reflected light is set so as to decrease the light density, the shortage of the value can be compensated for. On the other hand, with respect to the transmitted light passing through the color film once, although the chroma tends to be insufficient, if the thickness ratio in the optical path of the transmitted light is set so as to increase the light density, the shortage of the chroma can be compensated for. In this way, the color appearance by the reflected light and the color appearance of the transmitted light can be made uniform.

(3) In the color filter of the present invention, each of the color properties may include at least one of the hue (H) in the HVC colorimetric system, value (V) in the HVC calorimetric system, chroma (C) in the HVC calorimetric system, and light density, or a combination of at least two of these. That is, in the present invention, the first film and the second film can be formed so as to have different properties with respect to at least one of the properties described above.

Additionally, the light density corresponds to the capability of the color film to change the wavelength distribution of light per unit thickness. As the light density increases, the chroma of transmitted light is increased, and as the light density decreases, the chroma of transmitted light is decreased.

(4) In the color filter of the present invention, the first film and the second film may be formed using a color film material formed of a coloring agent dissolved in a solvent. By changing the quantity of the coloring agent in the color film material, it is possible to change the color property of the first film from that of the second film.

(5) In the color filter of the present invention, the first film may be formed into a concave shape in which the center is hollow, and the second film may be formed into a reversed convex shape in which the bottom surface is in contact with the hollow surface of the first film and the top surface is planar.

(6) In the color filter of the present invention, the first film may be formed into a convex shape in which the center protrudes, and the second film may be formed into a reversed concave shape in which the bottom surface is in contact with the protruding surface of the first film and the top surface is planar.

(7) In the color filter of the present invention, the plurality of dot-shaped color films may include a plurality of two-dimensionally arrayed color films having different hues.

(8) As mentioned as above, when the plurality of dot-shaped color films having different hues are two-dimensionally arrayed, for example, the different hues may be additive primary colors, red (R), green (G), and blue (B), or subtractive primary colors, cyan (C), magenta (M), and yellow (Y).

(9) In the color filter of the present invention, at least one of the first film and the second film may be deposited on the substrate by an ink-jet method. Hereinafter, the ink-jet method means a coating method in which, while scanning the surface of the substrate with an ink-jet head preferably provided with a plurality of fine ink nozzles, an ink, i.e., the color film material, is ejected as ink droplets from the ink nozzles so that the dot-shaped color films are deposited at predetermined positions on the substrate.

As the ink-jet method, a method of ejecting ink in which the volume of an ink chamber is varied using a piezoelectric element, etc., a method of ejecting ink using thermal expansion of ink by heating, etc. or the like may be employed. Any method may be employed as long as it enables the ejection of ink as ink droplets.

(10) In the color filter of the present invention, a film that is not deposited by the ink-jet method may be deposited on the substrate by photolithography. In the photolithography, for example, a color film material layer with a predetermined thickness is formed by a related art film-forming process, such as spin-coating, and the color film material layer is exposed in a predetermined pattern, followed by development to produce a film with the desired shape.

(11) Another color filter of the present invention includes a plurality of dot-shaped color films formed on a substrate. At least one of the dot-shaped color films includes a first film and a second film having different color properties, the first film and the second film being adjacent to each other, and one of the first film and the second film is formed of a material having ink-repellency with respect to the other.

When color display is performed using the color filter having the structure described above, light transmitted through the individual dot-shaped color films is observed by the viewer. At this stage, the color appearance is determined by whether light is transmitted through the first film or the second film in each dot. For example, when light transmitted through the first film is observed, the color appearance is greatly influenced by the color property of the first film. When light transmitted through the second film is observed, the color appearance is greatly influenced by the color property of the second film. As described above, in the color filter having the structure described above, the color appearance can be adjusted for each display unit in the color display obtained by the color filter.

(12) In the color filter having the structure described above, a reflective layer may be provided on the substrate or separately from the substrate, and openings may be formed in the reflective layer in the regions corresponding to the respective dot-shaped color films. Furthermore, one of the first film and the second film may be provided at a position corresponding to the opening, and the other may be provided at a position corresponding to the reflective layer.

In the structure described above, the description of "a reflective layer is provided on the substrate" means that the reflective layer is provided on the substrate on which the color filter is formed. On the other hand, the description of "a reflective layer is provided separately from the substrate" means that, for example, the reflective layer is provided on another substrate which faces the substrate on which the color filter is formed.

In the color filter having the structure described above, within the one dot-shaped color film, the films through which the optical path of the light reflected by the reflective layer and the optical path of the light transmitted through the opening pass can be switched between the first film and the second film. The light reflected by the reflective layer makes a round trip through the color film, i.e., it passes through the color film twice, and the light transmitted through the opening passes through the color film once. With respect to the light passing through the color film twice, although the value generally tends to be insufficient, if the optical path of the reflected light is set so as to pass through the film having a low light density, the shortage of the value can be compensated for. On the other hand, with respect to the transmitted light passing through the color film once, although the chroma generally tends to be insufficient, if the optical path of the transmitted light is set so as to pass through the film having a high light density, the shortage of the chroma can be compensated for. In this way, the color appearance by the reflected light and the color appearance by the transmitted light can be made uniform.

(13) In the color filter of the present invention, each of the color properties may include at least one of the hue (H) in the HVC calorimetric system, value (V) in the HVC colorimetric system, chroma (C) in the HVC colorimetric system, and light density. That is, in the present invention, the first film and the second film can be formed so as to have different properties with respect to at least one of the properties described above.

(14) In the color filter of the present invention, the first film and the second film may be formed using a color film material formed of a coloring agent dissolved in a solvent. By changing the quantity of the coloring agent in the color film material, it is possible to change the color property of the first film from that of the second film.

(15) In the color filter of the present invention, the plurality of dot-shaped color films may be formed by two-dimensionally arraying dot-shaped color films having different hues.

(16) As mentioned as above, when the plurality of dot-shaped color films having different hues are two-dimensionally arrayed, for example, the different hues may be additive primary colors, red (R), green (G), and blue (B), or subtractive primary colors, cyan (C), magenta (M), and yellow (Y).

(17) In the color filter of the present invention, one of the first film and the second film that is formed first may be deposited on the substrate by photolithography, and the other film formed subsequently may be deposited on the substrate by an ink-jet method.

The film formed by the photolithography serves as a bank when the other film is formed by the ink-jet method. In the present invention, since the film formed first can be formed of a film having ink-repellency with respect to the film formed later, when the material for the film formed later is supplied by the ink-jet method to the region surrounded by the film formed first, the film formed later can be formed uniformly on the substrate.

(18) A method for making a color filter including a plurality of dot-shaped color films formed on a substrate in accordance with the present invention includes forming first films in color-film-forming regions on the substrate, and forming second films on the first films, the first film and the second film having different color properties, the thickness ratio of the first film to the second film changes within one dot-shaped film.

When color display is performed using the color filter fabricated by the method described above, light transmitted through the individual dot-shaped color films is observed by the viewer. At this stage, the color appearance is determined by the thickness ratio of the first film to the second film in each dot-shaped color film. For example, if the thickness of the first film is larger than the thickness of the second film, the color appearance is greatly influenced by the color property of the first film. If the thickness of the second film is larger than the thickness of the first film, the color appearance is greatly influenced by the color property of the second film. As described above, in the method for making the color filter described above, the color appearance can be adjusted for each display unit in the color display obtained by the color filter.

(19) The method for making the color filter of the present invention may further include forming a reflective layer provided with openings on the substrate or separately from the substrate, each opening corresponding to each dot-shaped color film. Between the region corresponding to the opening and the region corresponding to the reflective layer, it is possible to form the first film and the second film so that the thickness ratio of the films is different.

In the structure described above, the description of "a reflective layer is provided on the substrate" means that the reflective layer is provided on the substrate on which the color filter is formed. On the other hand, the description of "a reflective layer is provided separately from the substrate" means that, for example, the reflective layer is provided on another substrate which faces the substrate on which the color filter is formed.

In the color filter fabricated by the method described above, within the one dot-shaped color film, it is possible to set different thickness ratios of the first film to the second film for the optical path of the light reflected by the reflective layer and for the optical path of the light passing through the opening. The light reflected by the reflective layer makes a round trip through the color film, i.e., it passes through the color film twice, and the light passing through the opening passes through the color film once. With respect to the light passing through the color film twice, although the value tends to be insufficient, if the thickness ratio in the optical path of the reflected light is set so as to decrease the light density, the shortage of the value can be compensated for.

On the other hand, with respect to the transmitted light passing through the color film once, although the chroma tends to be insufficient, if the thickness ratio in the optical path of the transmitted light is set so as to increase the light density, the shortage of the chroma can be compensated for. In this way, the color appearance by the reflected light and the color appearance by the transmitted light can be made uniform.

(20) In the method for making the color filter described above, each of the color properties may include at least one of the hue (H) in the HVC calorimetric system, value (V) in the HVC colorimetric system, chroma (C) in the HVC colorimetric system, and light density, or a combination of at least two of these. That is, in the present invention, the first film and the second film can be formed so as to have different properties with respect to at least one of the properties described above.

(21) In the method for making the color filter described above, the first film and the second film may be formed using a color film material composed of a coloring agent dissolved in a solvent. By changing the quantity of the coloring agent in the color film material, it is possible to change the color property of the first film from that of the second film.

(22) In the method for making the color filter described above, the first film may be formed into a concave shape in which the center is hollow, and the second film may be formed into a reversed convex shape in which the bottom surface is in contact with the hollow surface of the first film and the top surface is planar.

(23) In the method for making the color filter described above, the first film may be formed into a convex shape in which the center protrudes, and the second film may be formed into a reversed concave shape in which the bottom surface is in contact with the protruding surface of the first film and the top surface is planar.

(24) In the method for making the color filter described above, the plurality of dot-shaped color films may be formed by two-dimensionally arraying color films having different hues.

(25) As mentioned as above, when the plurality of dot-shaped color films having different hues are two-dimensionally arrayed, for example, the different hues may be additive primary colors, red (R), green (G), and blue (B), or subtractive primary colors, cyan (C), magenta (M), and yellow (Y).

(26) In the method for making the color filter described above, at least one of the step of forming the first films and the step of forming the second films may be performed by an ink-jet method.

(27) In the method for making the color filter described above, a step that is not performed by the ink-jet method may be performed by photolithography. In the photolithography, for example, a color film material layer with a predetermined thickness is formed by a related art film-forming process, such as spin-coating, and the color film material layer is exposed in a predetermined pattern, followed by development to produce the films with the desired shape.

(28) Another method for making a color filter including a plurality of dot-shaped color films formed on a substrate in accordance with the present invention includes forming a first film partially in a color-film-forming region for each dot-shaped color film, and forming a second film at a position adjacent to the first film in the color-film-forming region, the first film and the second film having different color properties. The first film is formed of a material having ink-repellency with respect to the second film.

When color display is performed using the color filter fabricated by the method described above, light transmitted through the individual dot-shaped color films is observed by the viewer. At this stage, the color appearance is determined by whether light is transmitted through the first film or the second film in each dot. For example, when light transmitted through the first film is observed, the color appearance is greatly influenced by the color property of the first film. When light transmitted through the second film is observed, the color appearance is greatly influenced by the color property of the second film. As described above, in accordance with the method for making the color filter described above, the color appearance can be adjusted for each display unit in the color display obtained by the color filter.

(29) The method for making the color filter described above may further include forming a reflective layer provided with openings on the substrate or separately from the substrate, each opening corresponding to each dot-shaped color film. One of the first film and the second film may be provided at a position corresponding to the opening, and the other may be provided at a position corresponding to the reflective layer.

In the structure described above, the description of "a reflective layer is provided on the substrate" means that the reflective layer is provided on the substrate on which the color filter is formed. On the other hand, the description of "a reflective layer is provided separately from the substrate" means that, for example, the reflective layer is provided on another substrate which faces the substrate on which the color filter is formed.

In the color filter manufactured by the method described above, the films through which the optical path of the light reflected by the reflective layer and the optical path of the light transmitted through the opening pass can be switched between the first film and the second film. The light reflected by the reflective layer makes a round trip through the color film, i.e., it passes through the color film twice, and the light transmitted through the opening passes through the color film once. With respect to the light passing through the color film twice, although the value tends to be insufficient, if the optical path of the reflected light is set so as to pass through the film having a low light density, the shortage of the value can be compensated for. On the other hand, with respect to the transmitted light passing through the color film once, although the chroma tends to be insufficient, if the optical path of the transmitted light is set so as to pass through the film having a high light density, the shortage of the chroma can be compensated for. In this way, the color appearance by the reflected light and the color appearance by the transmitted light can be made uniform.

(30) In the method for making the color filter described above, each of the color properties may include at least one of the hue (H) in the HVC calorimetric system, value (V) in the HVC calorimetric system, chroma (C) in the HVC colorimetric system, and light density, or a combination of at least two of these.

(31) In the method for making the color filter described above, the first film and the second film may be formed using a color film material composed of a coloring agent dissolved in a solvent. By changing the quantity of the coloring agent in the color film material, it is possible to change the color property of the first film from that of the second film.

(32) In the method for making the color filter described above, the plurality of dot-shaped color films may be formed by arraying color films having different hues in a two-dimensional pattern.

(33) As mentioned as above, when the plurality of dot-shaped color films having different hues are two-dimensionally arrayed, for example, the different hues may be additive primary colors, red (R), green (G), and blue (B), or subtractive primary colors, cyan (C), magenta (M), and yellow (Y).

(34) In the method for making the color filter described above, the forming the first film may be performed by photolithography and the forming the second film may be performed by an ink-jet method.

The first film formed by the photolithography serves as a bank when the second film is formed by the ink-jet method. In the present invention, since the first film can be formed of a film having ink-repellency with respect to the second film, when the second film is formed by the ink-jet method to the region surrounded by the first film, the second film can be formed uniformly on the substrate.

(35) A liquid crystal device of the present invention includes a pair of substrates sandwiching a liquid crystal layer, a circuit to drive the liquid crystal, and a color filter provided on one of the substrates. Any one of the color filters of the present invention described above is used as the color filter for the liquid crystal device. In the liquid crystal device, the color appearance can be adjusted for each display unit in the color display obtained by the built-in color filter.

(36) A method for making a liquid crystal device including a pair of substrates sandwiching a liquid crystal layer, a circuit to drive the liquid crystal, and a color filter provided on one of the substrates in accordance with the present invention, includes forming the color filter according to any one of the methods for making color filters described above.

(37) An electronic apparatus of the present invention includes a liquid crystal device and a casing containing the liquid crystal device. Any one of the liquid crystal devices having the structures described above is used as the liquid crystal device.

DETAILED DESCRIPTION OF PREFERRED EMBODIMENTS

FIRST EMBODIMENT OF COLOR FILTER AND LIQUID CRYSTAL DEVICE

Figure 1:
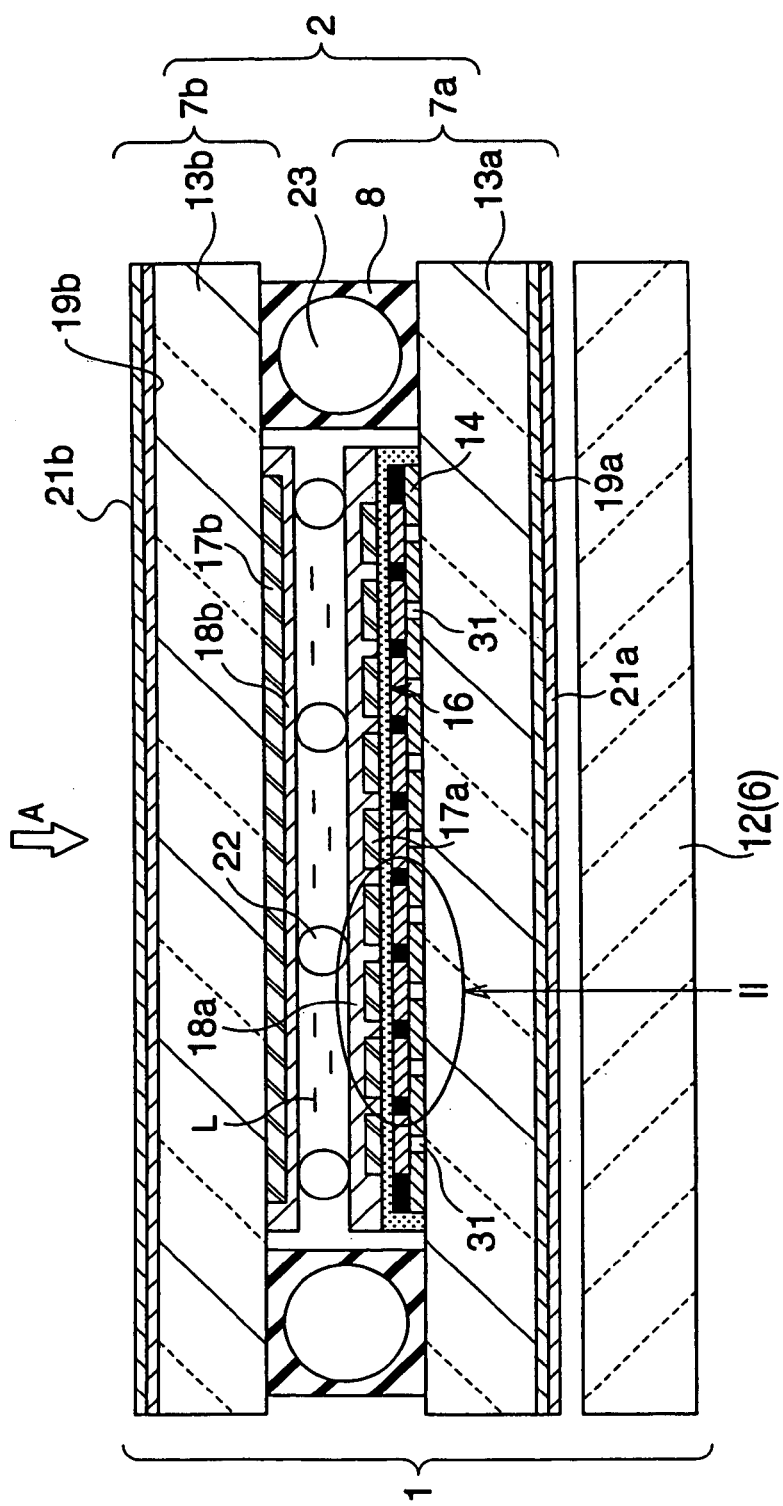
FIG. 1 is a sectional view which shows a structure of an embodiment of a liquid crystal device of the present invention.

FIG. 1 shows an embodiment of a liquid crystal device of the present invention including a color filter of the present invention. A liquid crystal device 1 is a simple matrix liquid crystal device which is operated without using switching elements, is a chip on glass (COG) type in which a driving IC is mounted directly on the substrate, is a transflective type which performs both reflective display and transmissive display, and produces a color display. The liquid crystal device 1 has the external appearance, for example, shown in FIG. 6.

Figure 6:
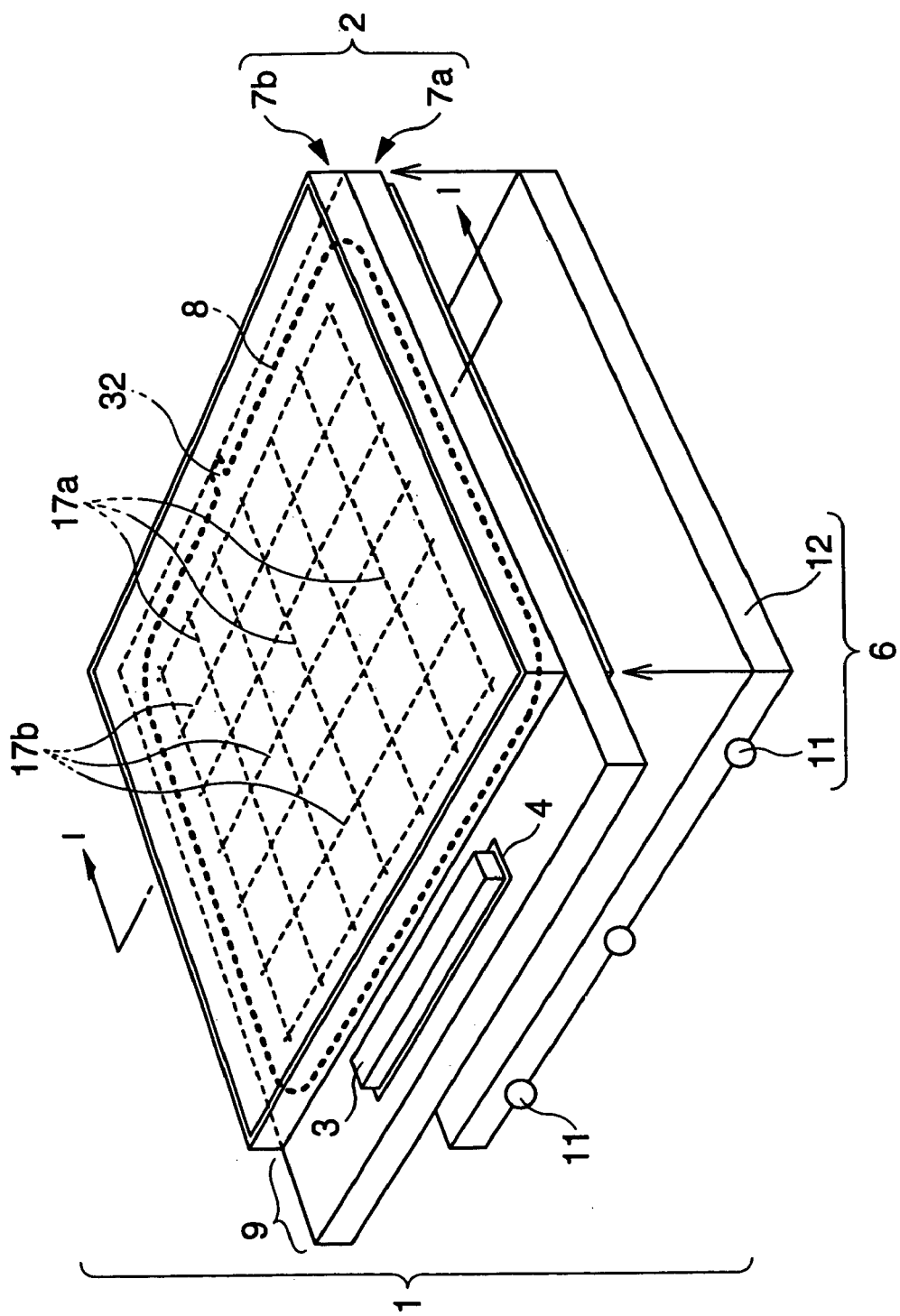
FIG. 6 is a perspective view showing the external appearance of an embodiment of a liquid crystal device of the present invention.

As shown in FIG. 6, in the liquid crystal device 1, a driving IC 3 is mounted on a liquid crystal panel 2, and an illumination unit 6 is also attached thereto. The liquid crystal panel 2 is formed by bonding a first substrate 7a and a second substrate 7b to each other by an annular sealing member 8. The first substrate 7a has a protruding section 9 which protrudes from the second substrate 7b, and the driving IC 3 is mounted on the protruding section 9 with a conductive adhesive film, such as an anisotropic conductive film (ACF), 4 therebetween.

The illumination unit 6 includes a light source 11 and a light guide 12. The light source 11 includes a point light source, such as a light emitting diode (LED), or a linear light source, such as a cold-cathode tube. The light guide 12 receives point or linear light produced by the light source 11 and emits planar light to the liquid crystal panel 2. Images, such as text, numerals, and graphics, are displayed on the surface opposite to the illumination unit 6.

FIG. 1 is a sectional view showing the structure of the liquid crystal device 1, taken along plane I—I of FIG. 6. As shown in FIG. 1, a gap, i.e., a so-called "cell gap", is formed between the first substrate 7a and the second substrate 7b which are bonded to each other by the sealing member 8, and a liquid crystal is enclosed in the cell gap to constitute a liquid crystal layer L. Reference numeral 22 represents a spacer which maintains a predetermined cell gap, and reference numeral 23 represents a conductive member mixed into the sealing member 8. The conductive member 23 electrically connects the lines on the side of the first substrate 7a to the lines on the side of the second substrate 7b.

The first substrate 7a includes a base 13a which is square when viewed from the A direction in FIG. 1, and a reflective layer 14 is formed on the liquid crystal side (upper surface in FIG. 1) of the base 13a. A color filter 16 is formed on the reflective layer 14, first electrodes 17a are formed thereon, and an alignment film 18a is formed further thereon. A retardation film 19a is formed on the outer surface (lower surface in FIG. 1) of the base 13a, and a polarizer 21a is formed thereon.

The second substrate 7b which faces the first substrate 7a includes a base 13b which is square when viewed from the A direction in FIG. 1, second electrodes 17b are formed on the liquid crystal side (lower surface in FIG. 1) of the base 13b, and an alignment film 18b is formed thereon. A retardation film 19b is formed on the outer surface (upper surface in FIG. 1) of the base 13b, and a polarizer 21b is formed thereon.

As shown in FIG. 6, the first electrodes 17a are formed of a plurality of linear electrodes which are arrayed in parallel, thus being formed in a striped pattern. The second electrodes 17b are formed of a plurality of linear electrodes which are arrayed in parallel so as to orthogonal to the first electrodes 17a, thus being formed in a striped pattern. In FIG. 6, in order to facilitate understanding of the structure, several first electrodes 17a and second electrodes 17b are illustrated with a large distance therebetween. Actually, many first electrodes 17a and second electrodes 17b are arrayed in high density with a small distance therebetween.

The first electrodes 17a and the second electrodes 17b intersect with each other at a plurality of points, and the intersections are arrayed in a matrix. Each intersection constitutes one display unit, i.e., a dot, and three dots composed of R, G, and B for color display constitute one pixel. A group of pixels constitute a display area, and images, such as text, are displayed in the display area.

Referring back to FIG. 1, the bases 13a and 13b are formed of a transparent glass, a transparent plastic, or the like. The reflective layer 14 is formed of aluminum, an aluminum alloy, a silver alloy, or the like. The first electrodes 17a and the second electrodes 17b are, for example, composed of indium tin oxide (ITO). The alignment films 18a and 18b are, for example, formed of a polyimide.

Figure 2:
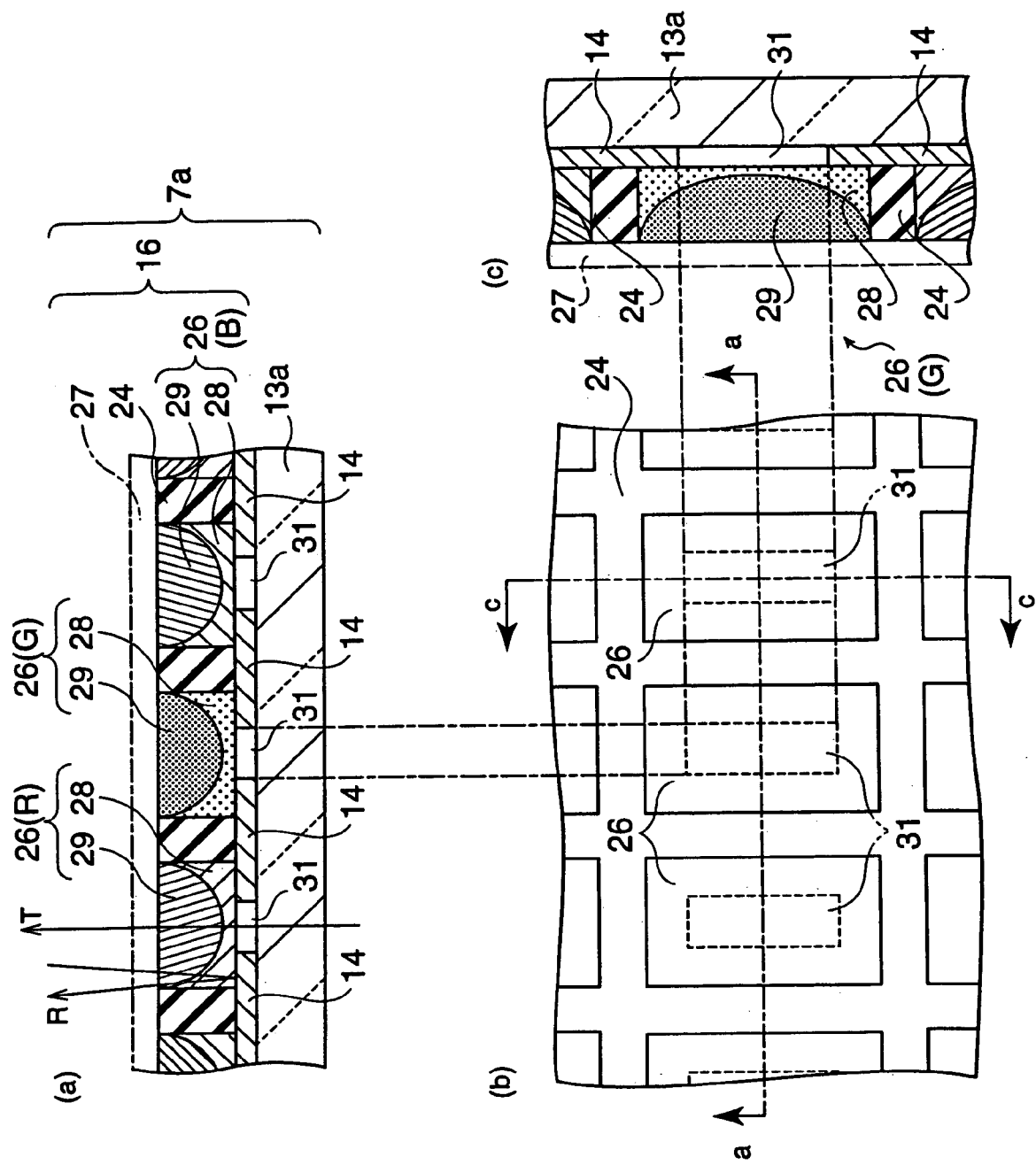
FIGS. 2(a)–2(c) are enlarged schematics of the section indicated by the arrow II in FIG. 1, which show an embodiment of a color filter of the present invention.

FIG. 2(a) is an enlarged schematic of the section indicated by the arrow II in FIG. 1. FIG. 2(b) is a plan view of three dot regions indicated by the arrow II in FIG. 1, viewed from the A direction. FIG. 2(c) is a sectional view taken along plane c—c of FIG. 2(b). As shown in FIG. 2(a), the color filter 16 includes a bank 24 which delimits dot regions, i.e., color-film-forming regions; color films 26 deposited on the reflective layer 14; and a protective film 27 deposited on the color films 26 and the bank 24.

The bank 24 may be formed so as to also function as a black mask by using a black resin. A black mask may be separately formed between the bank 24 and the base 13a.

Each color film 26 includes a first film 28 deposited on the reflective layer 14 and a second film 29 deposited on the first film 28. The reflective layer 14 is provided with openings 31 corresponding to the respective dot region which is enclosed by bank 24, i.e., color-film-forming regions. As for the color film 26, one pixel comprises from three units displaying each additive primary colors: red (R), green (G), blue (B).

In this embodiment, as shown in FIGS. 2(a) and 2(c), the first film 28 is formed into a concave shape in which the center is hollow, and the second film 29 is formed into a reversed convex shape in which the bottom surface is in contact with the hollow surface of the first film 28 and the top surface is planar. An opening 31 is formed at the bottom center of the color-film-forming regions, where the film thickness of the first film 28 becomes thin and where the second film 29 becomes thick.

In order to form the first films 28 and the second films 29, a fluid color film material is supplied to the individual dot regions and is then solidified by drying or firing. The color film material is formed by dissolving a coloring agent formed of a pigment, a dye, a natural, a natural pigment, or the like, and a binder resin in a solvent. In this embodiment, the first film 28 and the second film 29 have different compositions.

Specifically, the coloring agent contained in the film material for the first film 28 and the coloring agent contained in the film material for the second film 29 have the same hue, but the coloring agent quantity in the first film 28 is smaller than the coloring agent quantity in the second film 29. Thereby, although the first film 28 and the second film 29 have the same hue, the light density of the first film 28 is lower than that of the second film 29.

As described above, the opening 31, which is in a region free from the reflective layer 14, corresponds to the region in which the thickness of the first film 28 is thin and the thickness of the second film 29 is thick, i.e., the center of the dot region. The first film 28 has a lower light density than that of the second film 29. The first film 28 is concave-shaped, and the second film 29 is reversed convex-shaped.

External light, such as sunlight, received from the side opposite to the illumination unit 6, i.e., the viewer's side, through the second substrate 7b is reflected by the reflective layer 14 as indicated by symbol R in FIG. 2(a) and travels upward to be supplied to the liquid crystal layer L (refer to FIG. 1). At this stage, reflected light R makes a return trip through the color film 26, i.e., it passes through the color film 26 twice. Transmitted light T which is transmitted through the opening 31 passes through the color film 26 once and travels upward in FIG. 2(a) to be supplied to the liquid crystal layer L (refer to FIG. 1).

In the region through which the reflected light R passes twice, the first film 28 with the low light density is thick and the second film 29 with the high light density is thin. On the other hand, in the region through which the transmitted light T passes once, the first film 28 with the low light density is thin and the second film 29 with the high light density is thick. Therefore, in each dot region, the reflected light R passes through a region of the color film 26 with a relatively low light density, and the transmitted light T passes through a region of the color film with a relatively high light density. As a result, although the reflected light R passes through the color film 26 twice and the transmitted light T passes through the color film 26 once, the color appearance by the reflected light R and the color appearance by the transmitted light T are substantially the same or do not substantially produce an unnatural image. In some cases, the color appearance produced by the reflected light R may be intentionally set so as to differ from the color appearance by the transmitted light T.

Since the liquid crystal device 1 shown in FIG. 1 according to this embodiment has the structure described above, either reflective display or transmissive display can be selected as desired in the liquid crystal device 1. Reflective display is performed when external light, such as sunlight and interior light, is sufficient, and in such a case, external light enters the liquid crystal panel 2 through the second substrate 7b and passes through the liquid crystal layer L to reach the reflective layer 14. The light which reaches the reflective layer 14 is reflected by the reflective layer 14 and is supplied to the liquid crystal layer L.

On the other hand, when transmissive display is desired due to insufficient external light, referring to FIG. 6, the light source 11 is turned on, and planar light is supplied from the light guide 12 toward the liquid crystal panel 2. The light passes through the base 13a of the first substrate 7a, passes through the openings 31 formed in the reflective layer 14, and further passes through the color filter 16 to be supplied to the liquid crystal layer L.

While light is supplied to the liquid crystal layer L of the liquid crystal panel 2 in the reflective display mode and the transmissive display mode as described above, referring to FIG. 6, a driving IC 3 supplies either scanning signals or data signals to either the first electrodes 17a or the second electrodes 17b, when one signal is sent to one electrode, the other signal is sent to other electrode. In this way, the voltage applied to the liquid crystal layer L is controlled for each pixel, and more particularly, for each dot, the alignment of the liquid crystal is controlled for each dot. Furthermore, light passing through the liquid crystal layer L is modulated for each dot. The light which is modulated for each dot is selectively passed by the retardation film 19b and the polarizer 21b on the second substrate 7b side. Thus, images, such as text, are displayed, and in this embodiment, color display is performed.

In the liquid crystal device 1 in this embodiment, as shown in FIG. 2(a), within one dot region delimited by the bank 24, since the first film 28 is formed into a concave shape and the second film 29 is formed into a reversed convex shape, the thickness ratio of the first film 28 to the second film 29 changes within one dot region. Therefore, when color image displayed on the second substrate 7b side of the liquid crystal panel 2 shown in FIG. 1 is observed, the color appearance can be adjusted for each dot, i.e., for each display unit.

More specifically, for example, in the transflective liquid crystal device, such as the one in this embodiment, the color appearance obtained when reflected light which passes through the color filter twice is used and the color appearance obtained when transmitted light which passes though the color filter once is used can be adjusted with high accuracy by the color adjustment for each dot.

FIRST EMBODIMENT OF METHOD FOR MAKING COLOR FILTER AND METHOD FOR MAKING LIQUID CRYSTAL DEVICE

Figure 7:
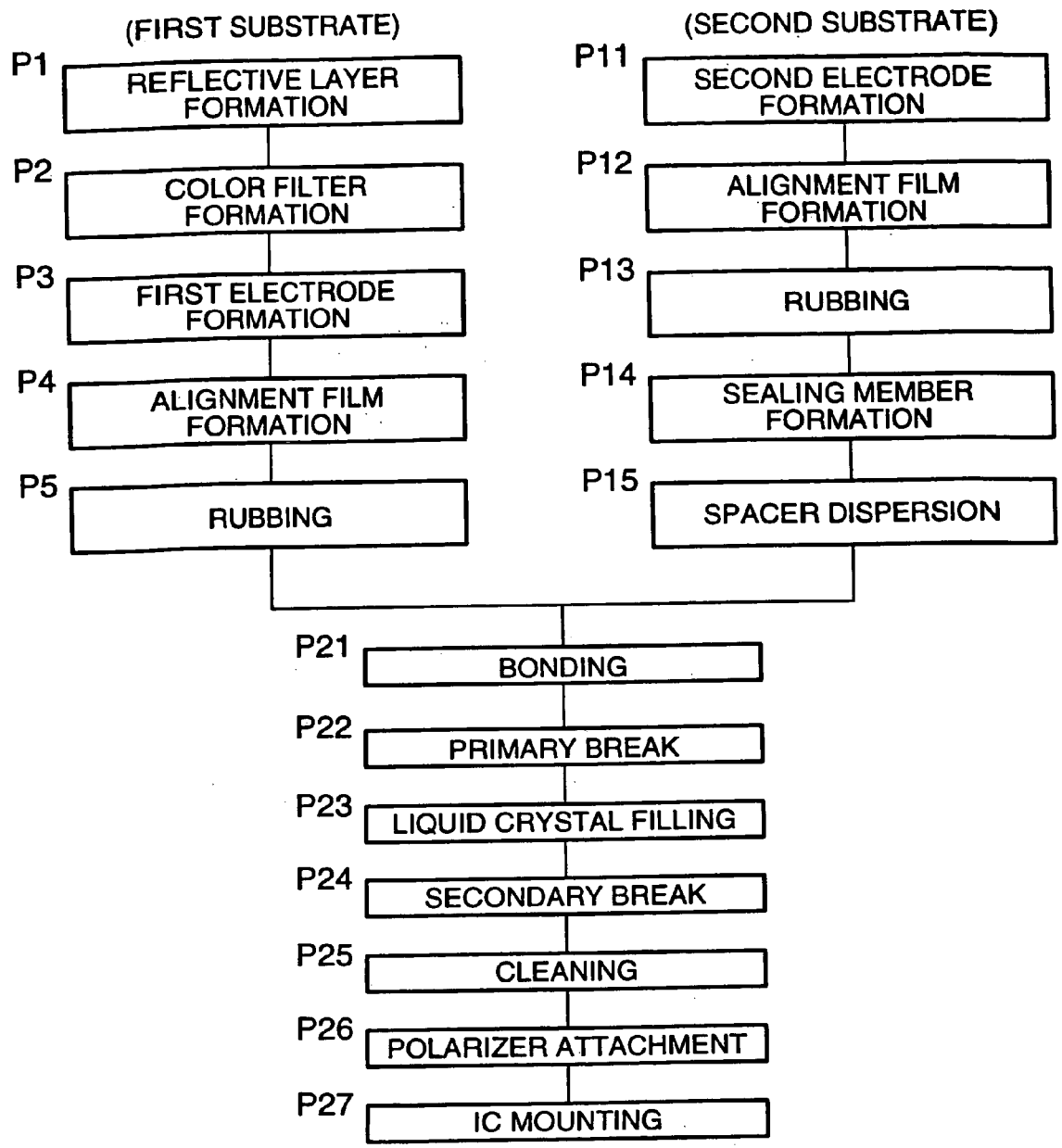
FIG. 7 is a flowchart which shows an embodiment of a method for making a liquid crystal device of the present invention.

An embodiment of a method for making the liquid crystal device 1 shown in FIG. 1 and a method for making the color filter 16 shown in FIGS. 2(a)–2(c) is described below. FIG. 7 is a flowchart which shows an embodiment of the method for making the liquid crystal device. In FIG. 7, a series of steps P1 to P5 concerns the formation of the first substrate 7a shown in FIG. 1, and a series of steps P11 to P15 concerns the formation of the second substrate 7b shown in FIG. 1.

Figure 11:
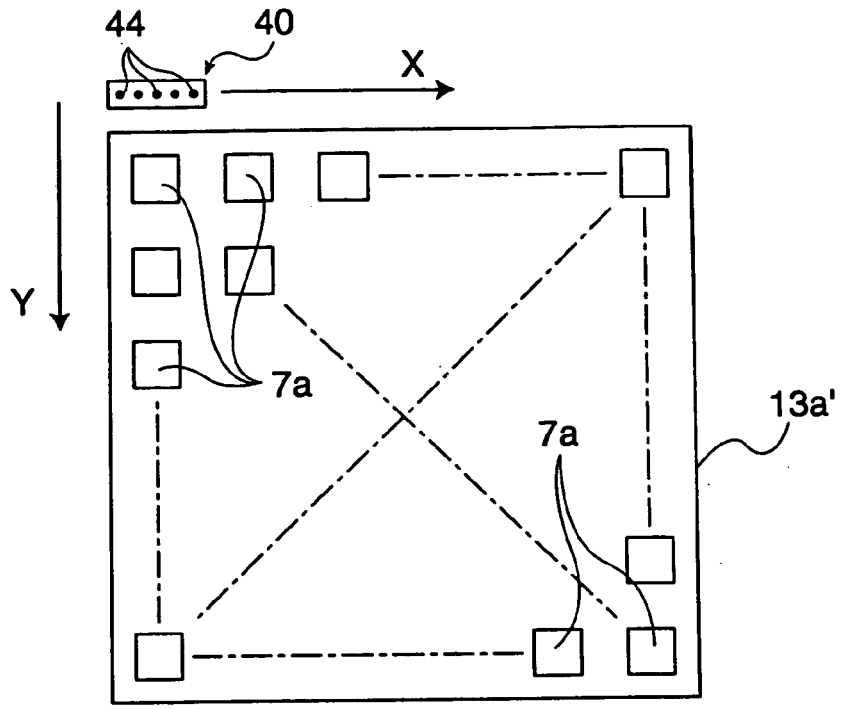
FIGS. 11(a) and 11(b) are schematics showing mother bases which are significant members used in a method for making a color filter of the present invention.
Figure 11:
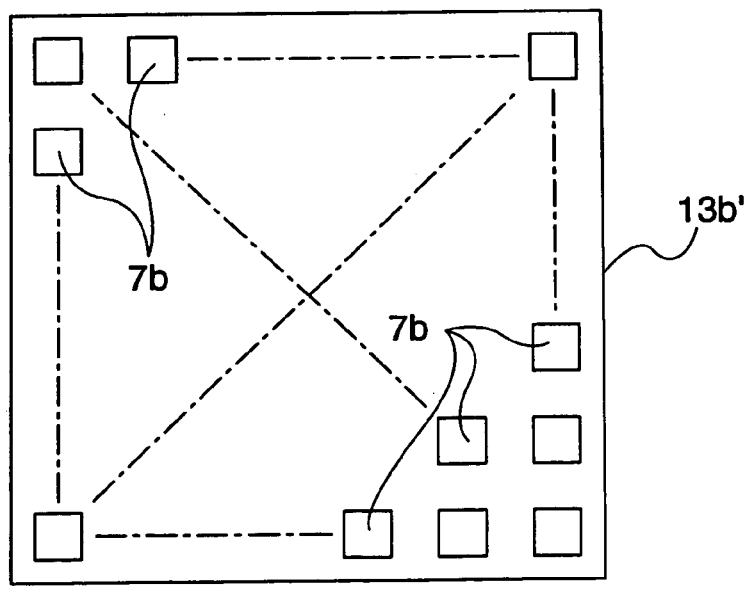

Additionally, in this embodiment, the first substrate 7a and the second substrate 7b are not formed separately, and as shown in FIG. 11(a), a liquid crystal panel pattern including a plurality of first substrates 7a is formed on a large area, i.e., a large mother base 13a'. As shown in FIG. 11(b), a liquid crystal panel pattern including a plurality of second substrates 7b is formed on a large mother base 13b'.

First, in step P1, reflective layers 14 (refer to FIG. 1) are formed on the surface of the mother base 13a' shown in FIG. 11(a) using aluminum, an aluminum alloy, a silver alloy, or the like, by a patterning method, such as photolithography. At this stage, openings 31 corresponding to the individual dot regions are formed. Next, in step P2, color filters 16 are formed on the mother base 13a' (refer to FIG. 11(a)). That is, the banks 24, the color films 26, and the protective film 27 shown in FIG. 2(a) are formed.

Next, in step P3 shown in FIG. 7, the first electrodes 17a shown in FIG. 1 are formed by a related art patterning method, such as photolithography, using ITO. In step P4, the alignment film 18a shown in FIG. 1 is formed by coating and firing, for example, using a polyimide, and in step P5, alignment treatment, such as rubbing treatment, is performed on the alignment film 18a to determine the alignment of the liquid crystal. Thereby, a plurality of first substrates 7a are formed on the mother base 13a' shown in FIG. 11(a).

On the other hand, in step P11 shown in FIG. 7, the second electrodes 17b are formed on the mother base 13b' shown in FIG. 11(b) by a related art patterning method, such as photolithography, using ITO. In step P12, the alignment film 18b shown FIG. 1 is formed by coating and firing, for example, using a polyimide, and in step P13, alignment treatment, such as rubbing treatment, is performed on the alignment film 18b to determine the alignment of the liquid crystal.

Next, in step P14, the sealing member 8 shown in FIG. 1 is formed on the surface of the mother base 13b' by printing or the like, and in step P15, the spacers 22 shown in FIG. 1 are dispersed. Thereby, a plurality of second substrates 7b are formed on the mother base 13b' shown in FIG. 11(b).

When the mother base 13a' provided with a plurality of first substrates 7a and the mother base 13b' provided with a plurality of second substrates 7b are ready, in step P21, the mother bases 13a' and 13b' are bonded to each other with the sealing member 8 therebetween. Thereby, a large panel structure including a plurality of liquid crystal panels 2 shown in FIG. 1 are produced.

In next step, the large panel structure is subjected to first cutting, i.e., primary break, to produce a long panel structure, i.e., a so-called rectangular panel structure is formed, in which liquid-crystal-filling ports 32 (refer to FIG. 6) of the individual liquid crystal panels are exposed. In step P23, a liquid crystal is filled in the individual liquid crystal panels in the rectangular panel structure via the exposed liquid-crystal-filling ports 32, and the liquid-crystal-filling ports 32 are then sealed with a resin or the like.

Next, in step P24, the rectangular panel structure after the liquid crystal filling step is subjected to second cutting, i.e., as shown in FIG. 6, secondary break, to separate the individual liquid crystal panels 2. Each liquid crystal panel 2 is cleaned in step P25 to remove the excess liquid crystal, etc., and in step P26, the retardation films 19a and 19b and the polarizers 21a and 21b shown in FIG. 1 are attached to the liquid crystal panel by pasting or the like. In step P27, the driving IC 3 shown in FIG. 6 is mounted on the first substrate 7a, and the illumination unit 6 is attached to the liquid crystal panel 2. The liquid crystal device 1 is thereby completed.

Figure 8:
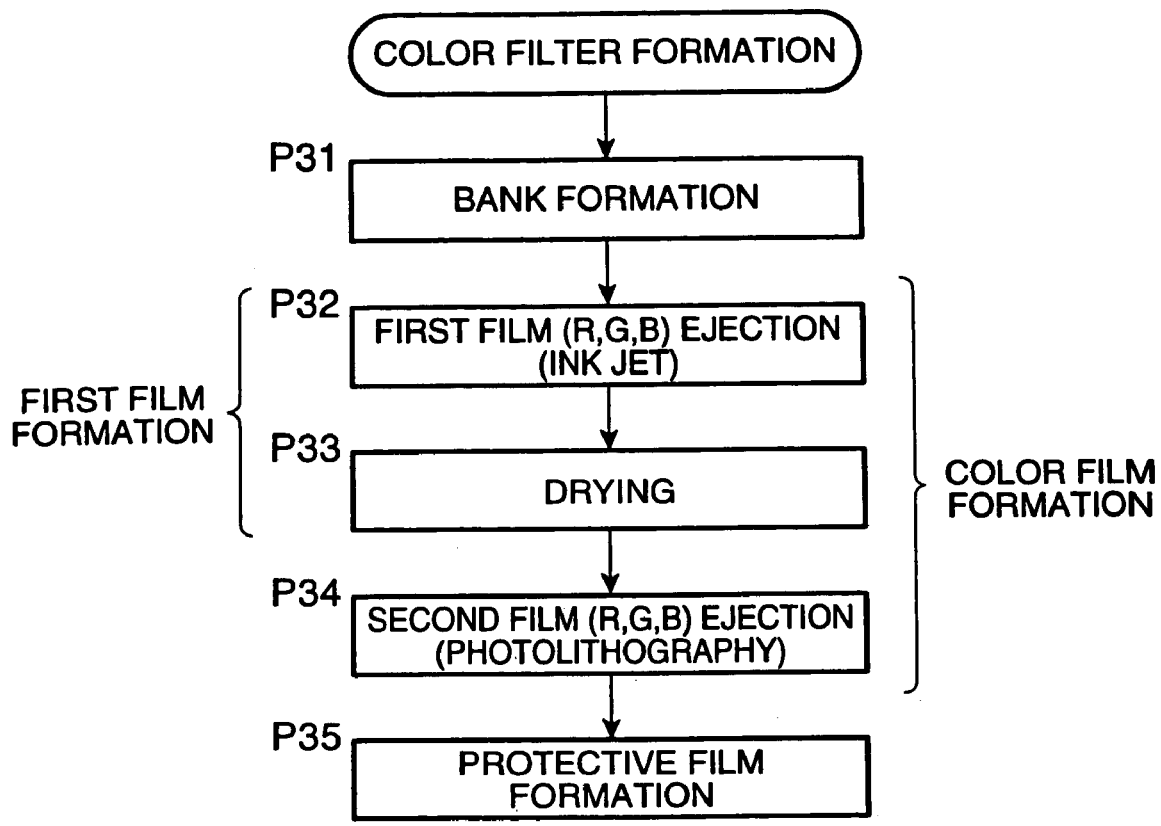
FIG. 8 is a flowchart which shows a main process of the fabrication method shown in FIG. 7 and which shows an embodiment of a method for making a color filter of the present invention.

Among the series of steps described above, the color filter formation step P2 is performed, for example, in accordance with the flowchart shown in FIG. 8. That is, first, in step P31, the bank 24 is formed in a grid pattern as shown in FIG. 2(b) by an appropriate patterning method, such as photolithography, using an ink-repellent material. By forming the bank 24 in a grid pattern as described above, a plurality of dot regions arrayed in a matrix is delimited by the bank 24. Additionally, the ink-repellent material does not easily adhere to the first film 28 shown in FIG. 2(a), that is, repels the first film 28. Additionally, the bank 24 may be formed using a black resin so as to function as a black mask.

Next, in step P32, first color films 28 of R, G, and B are supplied to predetermined dot regions in sequence by an ink-jet method. The predetermined dot regions are determined depending on how the individual colors, R, G, and B are arranged, and examples of arrangements include a striped arrangement, a mosaic arrangement, and a delta arrangement.

In the striped arrangement, colors are arranged so that all of the color pixels in a single column are of the same color. In the mosaic arrangement, colors are arranged so that any three color pixels aligned vertically or horizontally correspond to three colors, R, G, and B. In the delta arrangement, alternate rows are staggered and any three adjacent color pixels correspond to three colors, R, G, and B.

In order to apply the color film material by the ink-jet method, for example, as shown in FIG. 11(a), an ink-jet head 40 is placed at a corner, which is the starting position, of the mother base 13a'. By moving the ink-jet head 40 in the X direction for main scanning and also in the Y direction for subscanning, the entire surface of the mother base 13a' is scanned by the ink-jet head 40. The ink-jet head 40 is provided with a plurality of nozzles 44. When the mother base 13a' is scanned with the ink-jet head 44, an ink, i.e., the color film material, is ejected from the nozzles 44 at appropriate timing corresponding to the desired color arrangement, and the ejected color film material is applied to the base.

Figure 13:
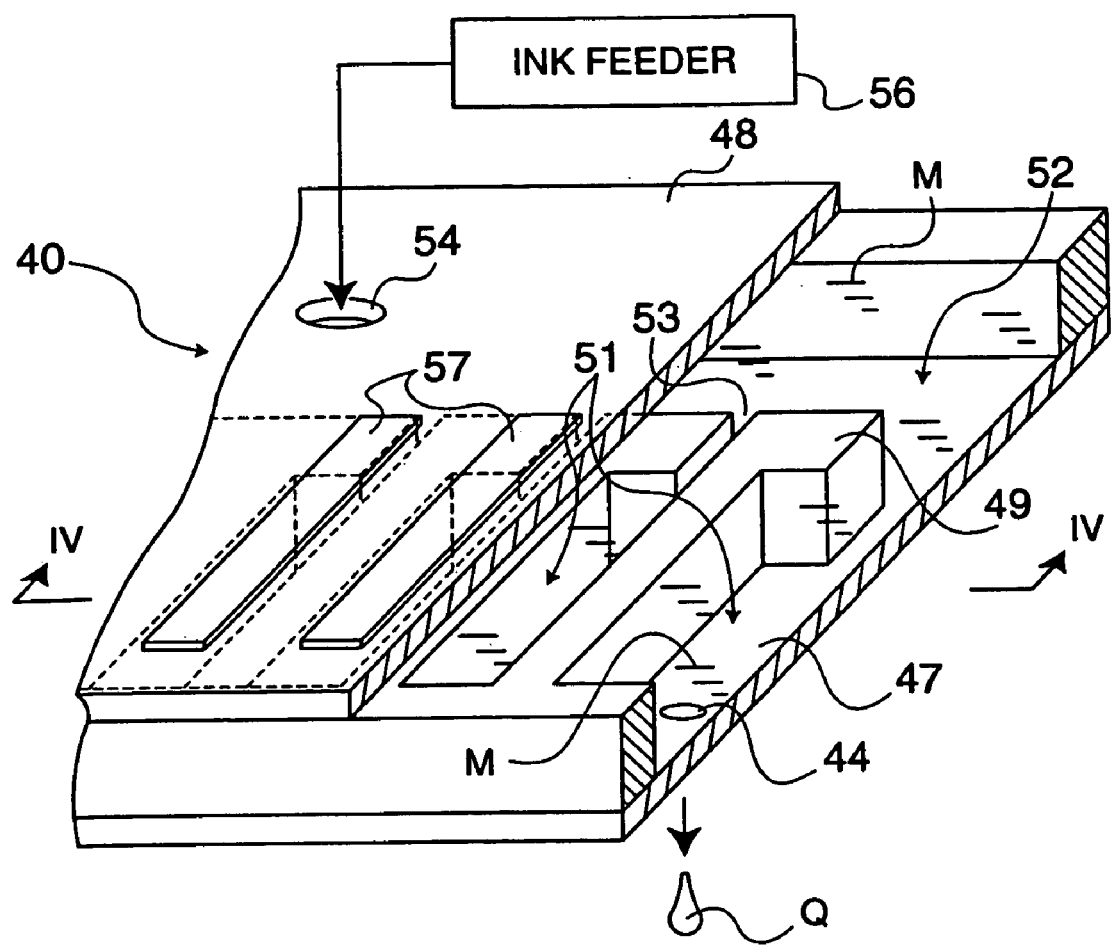
FIG. 13 is a perspective view which shows the internal structure of an example of an ink-jet head.

The ink-jet head 40 may have any structure as long as the color film material can be ejected as liquid droplets of very small size. For example, a structure shown in FIG. 13 may be used. As shown in FIG. 13, an ink-jet head 40 includes, a nozzle plate 47 formed of a stainless steel, a vibrating plate 48 opposed thereto, and a plurality of partitioning members 49 to bond the plates to each other. A plurality of ink chambers 51 and a liquid pool 52 are formed by the partitioning members 49 between the nozzle plate 47 and the vibrating plate 48. The plurality of ink chambers 51 communicate with the liquid pool 52 via passages 53.

An ink feed port 54 is formed at an appropriate position of the vibrating plate 48, and an ink feeder 56 is connected to the ink feed port 54. The ink feeder 56 feeds a color film material M to the ink feed port 54. The fed color film material M fills the liquid pool 52, passes through the passages 53, and fills the ink chambers 51.

The nozzle plate 47 is provided with nozzles 44 to jet the color film material M from the ink chambers 51. Pressure-applying units 57 corresponding to the ink chambers 51 are attached to the outer surface of the vibrating plate 48, which forms the ink chambers 51.

Figure 14:
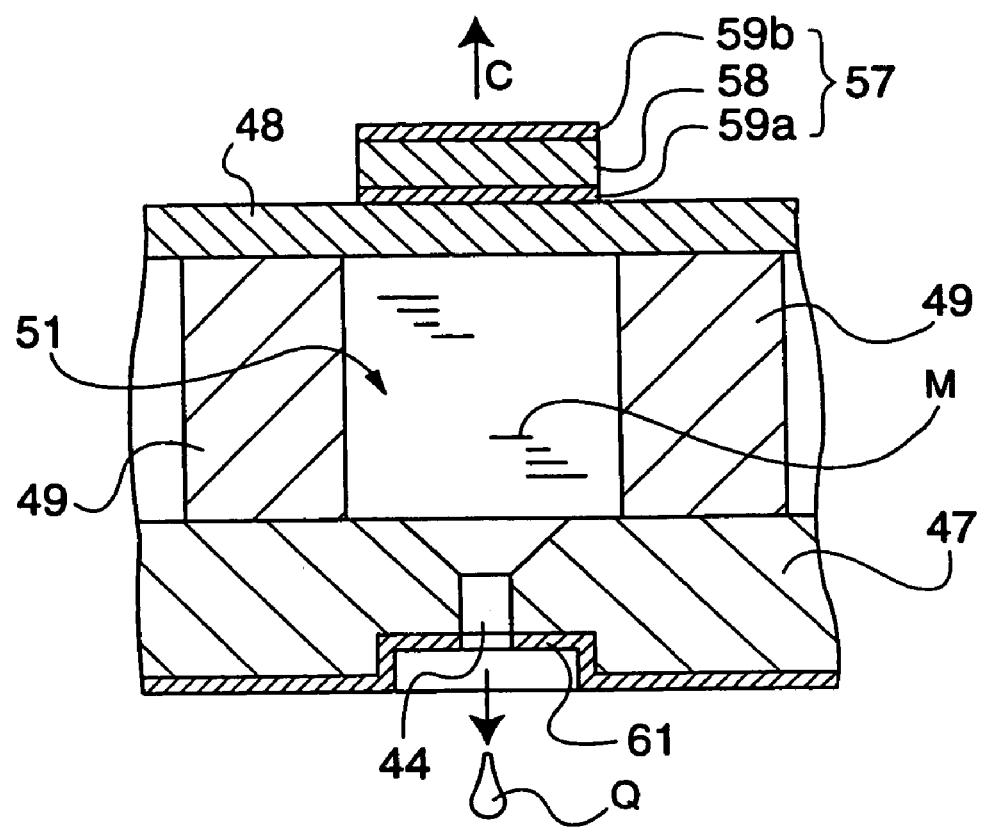
FIG. 14 is a sectional view taken along plane IV—IV of FIG. 13.

The pressure-applying unit 57 includes a piezoelectric element 58 and a pair of electrodes 59a and 59b sandwiching the piezoelectric element 58 as shown in FIG. 14.

The piezoelectric element 58 deflects so as to protrude outside in the direction indicated by the arrow C when current is applied to the electrodes 59a and 59b, and thereby the volume of the ink chamber 51 is increased. As a result, the color film material M, in an amount equivalent to the increase in the volume of the ink chamber 51, flows from the liquid pool 52 into the ink chamber 51 through the passage 53.

When the applied current is turned off, the piezoelectric element 58 and the vibrating plate 48 regain their original shapes. Thereby, the volume of the ink chamber 51 also returns to the original volume, and as a result, the pressure of the color film material M in the ink chamber 51 is increased, and the color film material M is ejected as liquid droplets Q from the nozzle 44. Additionally, an ink-repellent layer 61, for example, formed of a Ni-tetrafluoroethylene eutectoid plating layer, is formed in the periphery of the nozzle 44 in order to prevent or substantially prevent warping of ejected liquid droplets Q and clogging of the nozzle 44.

Figure 12:
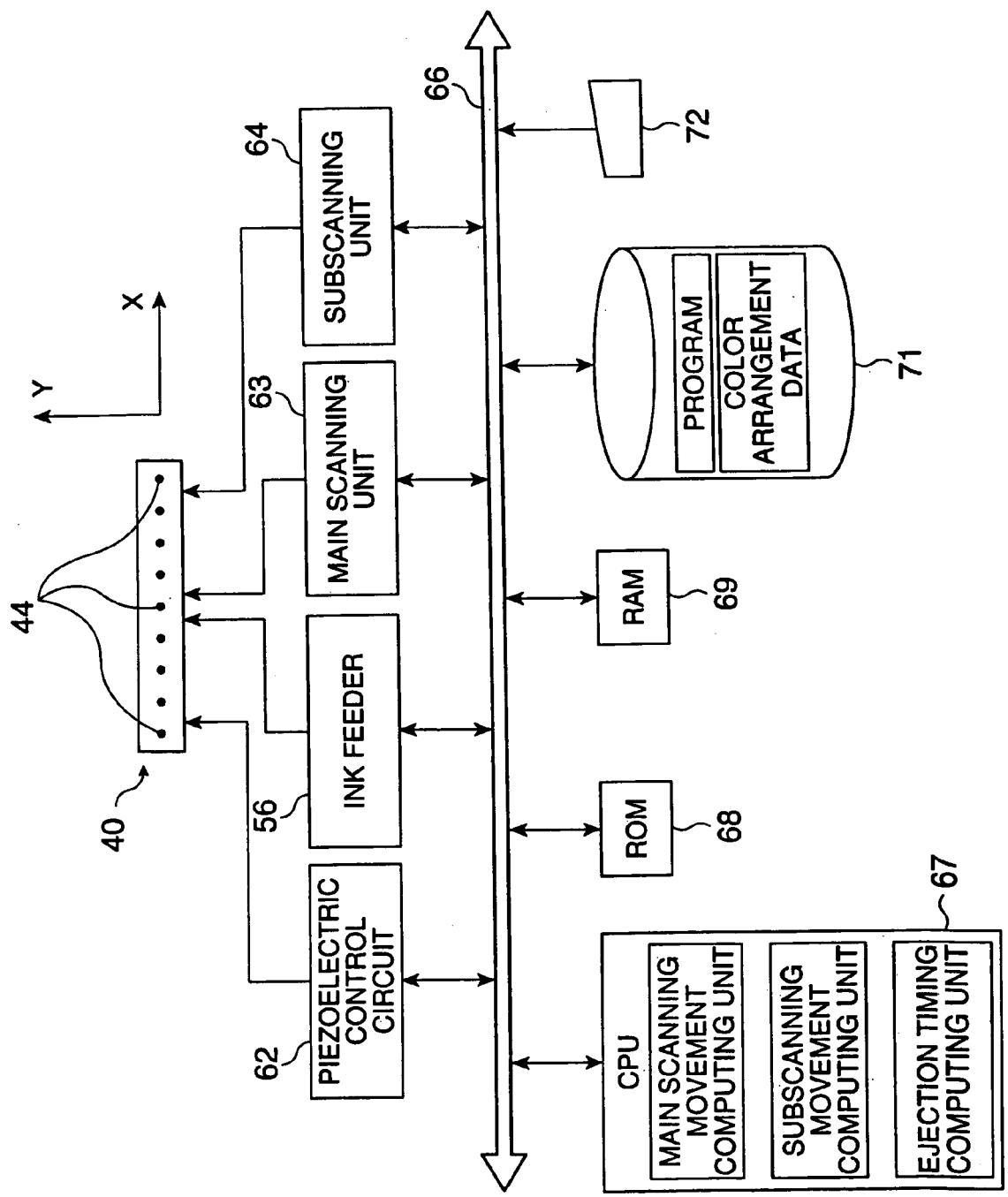
FIG. 12 is a schematic showing an example of a control system for an ink-jet head to achieve the film formation by an ink-jet method.

A control system to control the scanning movement of the ink-jet head 40 may have any configuration, and for example, a computer system using a central processing unit (CPU) shown in FIG. 12 may be used.

In the control system shown in FIG. 12, the ink-jet head 40 is connected to a piezoelectric control unit 62 to control the voltage applied to the piezoelectric element 58, the ink feeder 56 described with reference to FIG. 13, a main scanning unit 63 to reciprocate the ink-jet head 40 in the main scanning direction X, and a subscanning unit 64 to reciprocate the ink-jet head 40 in the subscanning direction Y.

The main scanning unit 63 and the subscanning unit 64 must move the ink-jet head 40 finely with high accuracy. For example, a driving unit having a pulse motor or a servomotor which can control the output rotation angle finely with high accuracy as the power source may be used.

The input/output terminals of the above units are connected to a bus 66, and the bus 66 are also connected to a CPU 67, a ROM 68, a RAM 69, an information storage medium 71, and an input unit 72, such as a keyboard. The ROM 68 stores, for example, overall initial information of the computer. The RAM 69 sores various data temporarily, or is used as a work area, etc., for the CPU 67.

The information storage medium 71 includes a hard disk, a CD (compact disc)-ROM, a memory card, or other storage medium, and stores a program to make the computer system to function for ink-jet processing, data to specify the color arrangement, such as a striped arrangement or a delta arrangement, of the color films constituting the color filter, etc.

When the computer system is started, data stored in the information storage medium 71 are transferred to the RAM 69, and the CPU 67 performs the major function to achieve coating treatment by the ink-jet method based on the data. For example, the CPU 67 computes the movements of the ink-jet head 40 in the main scanning direction X and the subscanning direction Y so that the desired color arrangement is achieved, and computes the driving timing of the piezoelectric element during the scanning movement to achieve the desired color arrangement.

The ink-jet head 40 and the apparatuses to drive the ink-jet head 40 are constructed as described above. In the first film ejection step P32 shown in FIG. 8, first, referring to FIG. 11(a), while the surface of the mother base 13a' is entirely scanned by the ink-jet head 40 which is set so as to eject the first color among R, G, and B, an ink, i.e., the color film material of the first color, is ejected from the nozzle 44 with the appropriate timing determined by the program and supplied to the predetermined dot regions. In step 33, the color film material is solidified by drying. Referring to FIG. 2(a), the first film 28 of the first color among R, G, and B is thereby formed.

In this embodiment, the first film 28 is formed into a concave shape in which the center becomes hollow. In order to form such a shape, in the drying step P33, the color film material may be dried at a relatively high temperature for a relatively short period, for example, may be heated at approximately 100° C. for approximately 1 minute.

After the first films 28 with respect to the first color among R, G, and B are formed, first films 28 of the second color are formed in the predetermined dot regions by repeating the same operation as that described above using the ink-jet head 40 which is set so as to eject the second color among R, G, and B. First films 28 of the third color are then formed similarly. The first film formation process (steps P32 and P33) is thereby completed as shown in FIG. 8.

Next, in step P34 shown in FIG. 8, with respect to the individual colors, R, G, and B, second films 29 are formed in the predetermined dot regions using photolithography. The color films 26 in which the second films 29 are deposited on the first films 28 are thereby formed. Additionally, the materials for the first film 28 and the second film 29 are produced by dissolving a coloring agent, such as a pigment, with a binder resin, in a solvent. By using the film materials with different quantity of the coloring agent, different light densities are set for the first film 28 and the second film 29. Specifically, the quantity of the coloring agent is lower in the first film 28 compared to the second film 29 so as to have a lower light density.

After the color films 26 of R, G, B are formed in the predetermined color arrangement, in step P35 shown in FIG. 8, the protective film 27 shown in FIG. 2(a) is formed with a uniform thickness by spin-coating, an inkjet method, or the like, using a resin, such as an acrylic resin or a polyimide, or an inorganic film, such as a silicon oxide film.

When the color films 26 are formed, both the first films 28 and the second films 29 may be formed by photolithography. However, in the case of photolithography, complex steps, such as the film coating step, the exposure step using a pattern, and the development step, must be repeated with respect to the three colors, R, G, and B, and the process becomes extremely complex and time-consuming. In contrast, in this embodiment in which the first films 28 are formed by the ink-jet method, very simple steps of ejecting the color film material and drying are performed, thus being advantageous.

In the photolithography, it is very difficult to form the first film 28 into a concave shape as shown in FIGS. 2(a) and 2(c). By using the ink-jet method, such a concave shape can be easily formed.

SECOND EMBODIMENT OF COLOR FILTER

Figure 3:
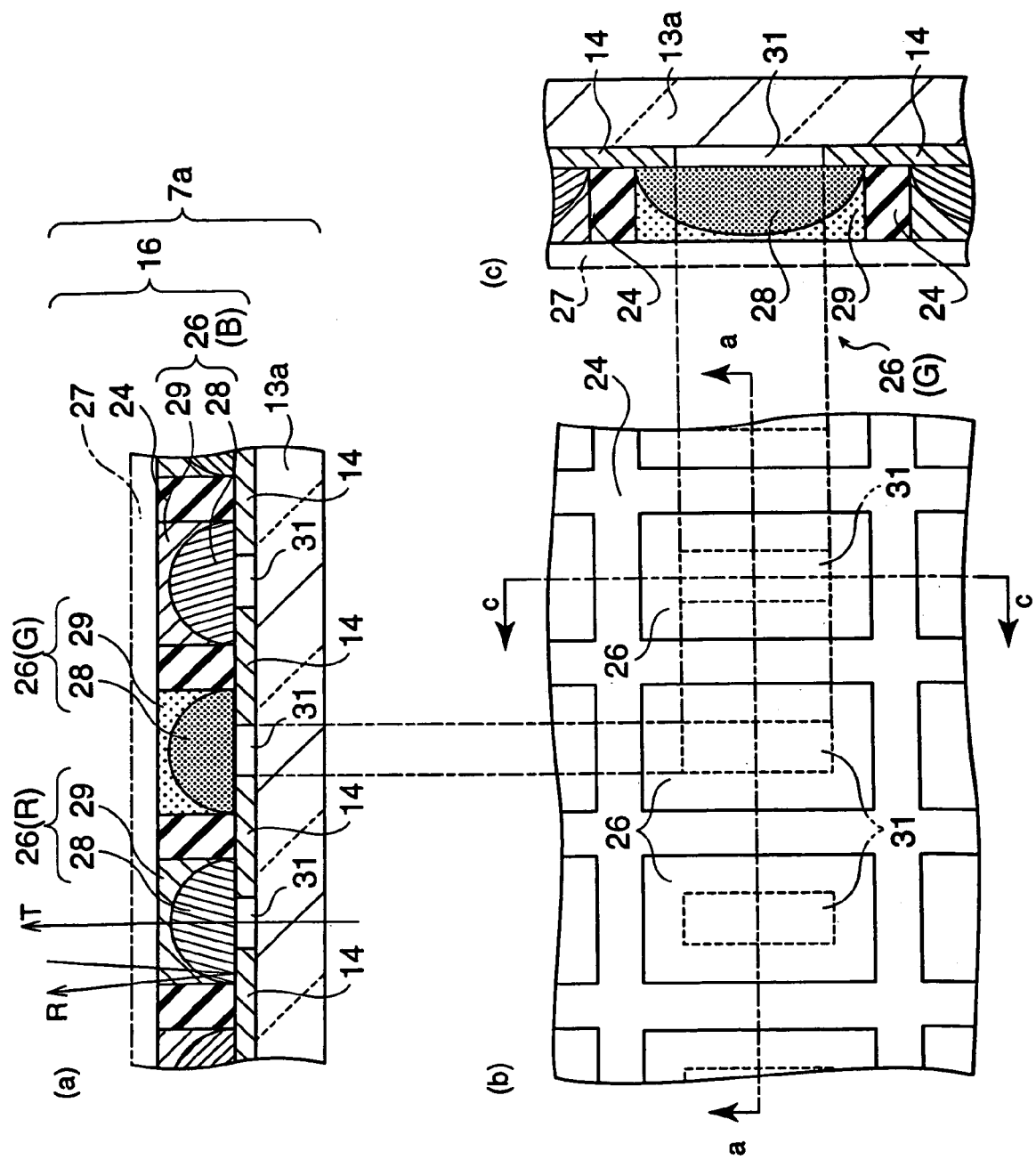
FIGS. 3(a)–3(c) are schematics showing another embodiment of a color filter of the present invention.

FIGS. 3(a)–3(c) show another embodiment of a color filter of the present invention. A color filter 16 can be used for the liquid crystal device 1 shown in FIG. 1. In the color filter 16 in the previous embodiment shown in FIGS. 2(a) and 2(c), the first film 28 is formed into a concave shape in which the center is hollow, and the second film 29 is formed into a reversed convex shape in which the bottom surface is in contact with the hollow surface of the first film 28 and the top surface is planar.

In contrast, in the color filter 16 in this embodiment, as shown in FIG. 3(a)–3(c), the first film 28 is formed into a convex shape in which the center protrudes from the base 13a, i.e., in a dome shape, and the second film 29 is formed into a reversed concave shape in which the bottom surface is in contact with the protruding surface of the first film 28 and the top surface is planar.

The first film 28 in the dome shape in which the center protrudes may be formed by an ink-jet method or the like. When the first film 28 is formed by the ink-jet method, the dome shape may be formed by drying the color film material applied by the ink-jet method at a relatively low temperature for a relatively long period, for example, by heating at approximately 40° C. for approximately 10 minutes. Additionally, the second film 29 may by formed by an ink-jet method, spin-coating, or any other appropriate film-forming method.

Since the first film 28 is formed into a convex shape and the second film 29 is formed into a reversed concave shape, the light density of the first film 28 is higher than the light density of the second film 29 in this embodiment. Due to such a construction, with respect to the optical path of transmitted light T transmitted through the opening 31, the first film 28 having the high light density is thick and the second film 29 with the low light density is thin. With respect to the optical path of reflected light R reflected from the reflective layer 14, the first film 28 with the high light density is thin and the second film 29 with the low light density is thick.

Consequently, with respect to the reflected light R which passes through the color film 26 twice, the chroma is set to be lower and the value is set to be higher. On the other hand, with respect to the transmitted light L which passes through the color film 26 only once, the chroma is set to be higher and the value is set to be lower. As a result, the color appearance when using the reflected light R and the color appearance when using the transmitted light T can be set to be substantially the same or to be close to each other. In some cases, the color appearance by the reflected light R may be intentionally set so as to differ from the color appearance by the transmitted light T.

SECOND EMBODIMENT OF METHOD FOR MAKING COLOR FILTER

Figure 9:
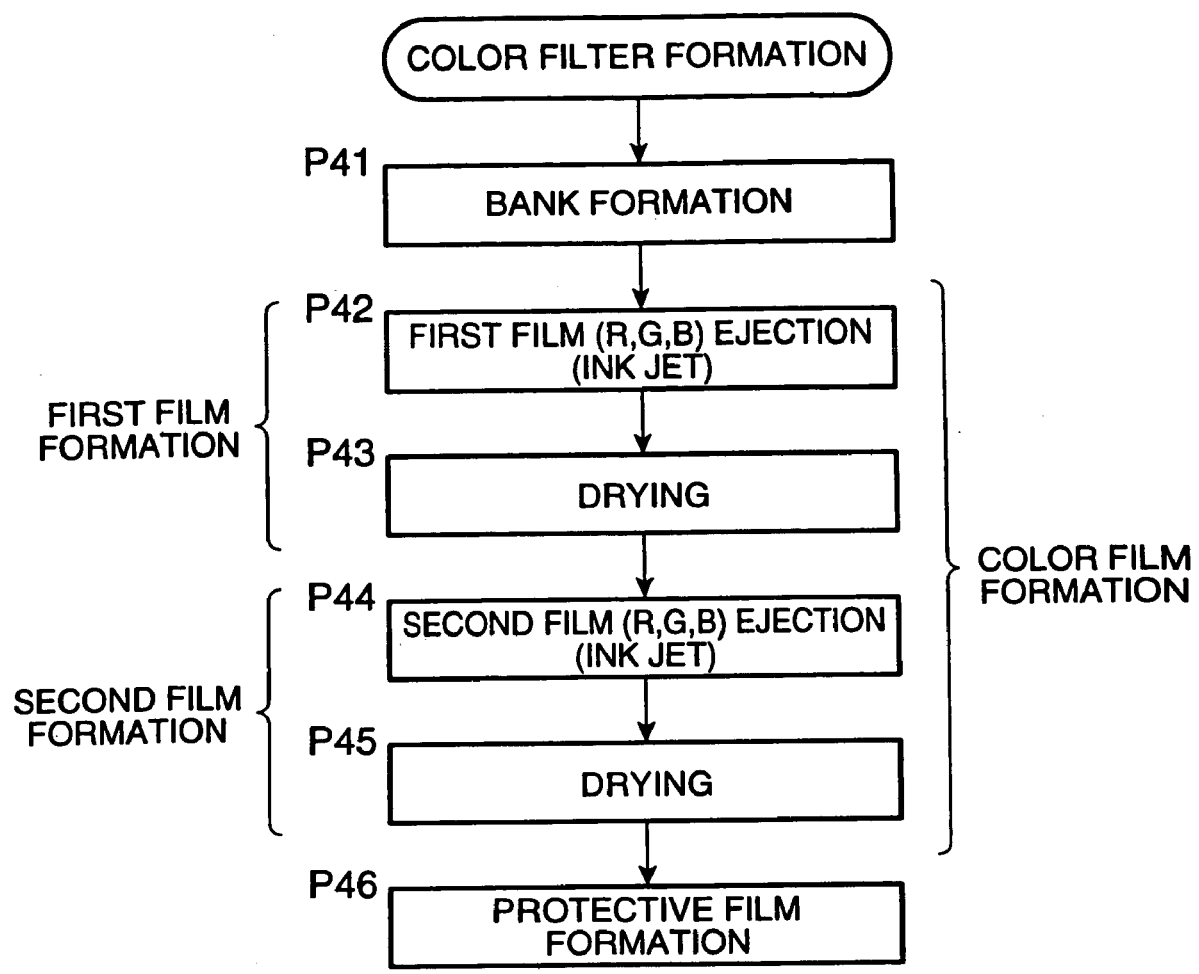
FIG. 9 is a flowchart which shows another embodiment of a method for making a color filter of the present invention.

FIG. 9 is a flowchart which shows another embodiment of a method for making a color filter of the present invention. In the previous embodiment shown in FIG. 8, in the color film formation process from step P32 through step P34, the steps P32 and P33 to form the first film are performed by the ink-jet method, and the second film formation step P34 is performed by photolithography.

In contrast, in this embodiment, both the first film formation process (steps P42 to P43) and the second film formation process (steps P44 and P45) are performed by the ink-jet method. Consequently, the color film formation process can be performed more rapidly and with high accuracy.

Additionally, when the second films are formed by photolithography or spin-coating, the entire surface state of the resultant color filter becomes uniform. If the second films are formed by the ink-jet method, the surface state of the color filter can be freely adjusted for each pixel or for each dot.

SECOND EMBODIMENT OF LIQUID CRYSTAL DEVICE AND THIRD EMBODIMENT OF COLOR FILTER

Figure 4:
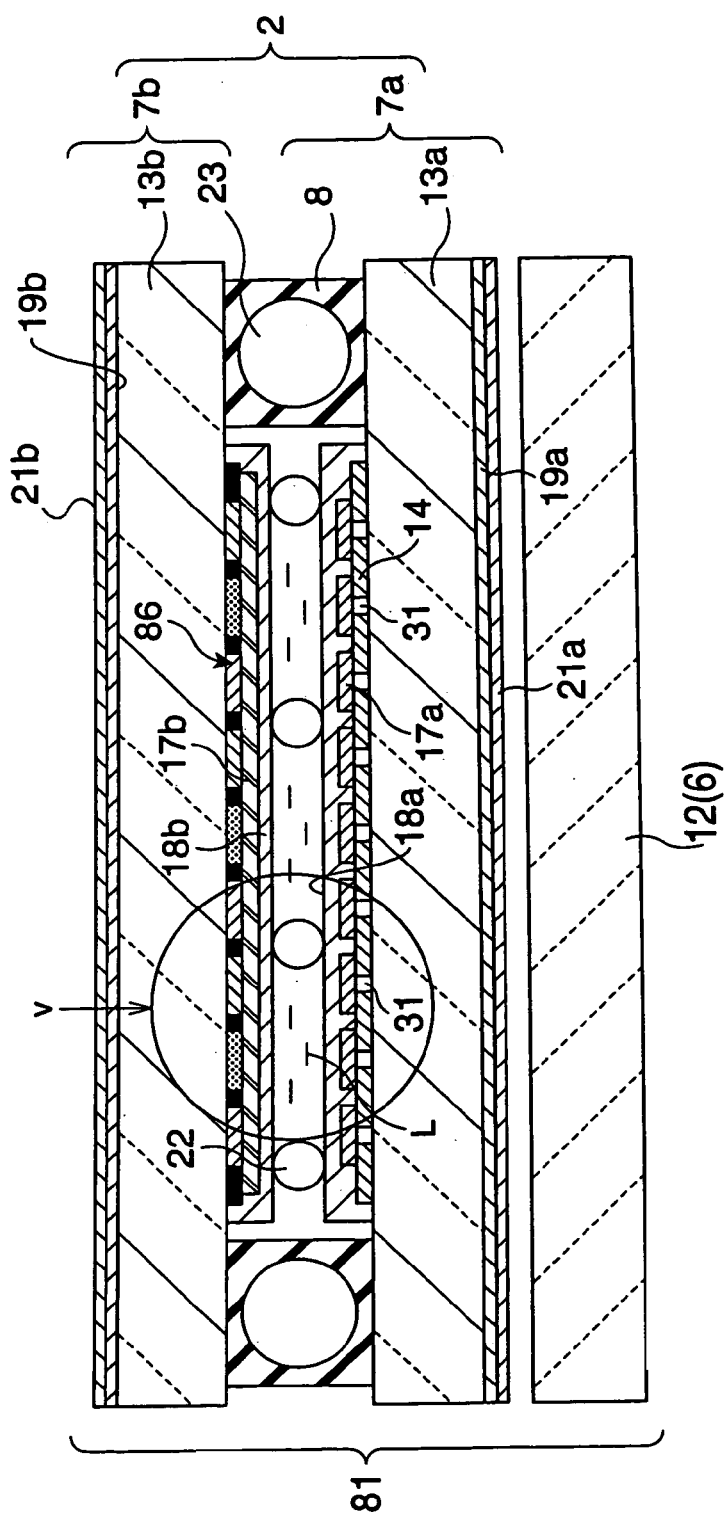
FIG. 4 is a sectional view, which shows a structure of another embodiment of a liquid crystal device of the present invention.
Figure 5:
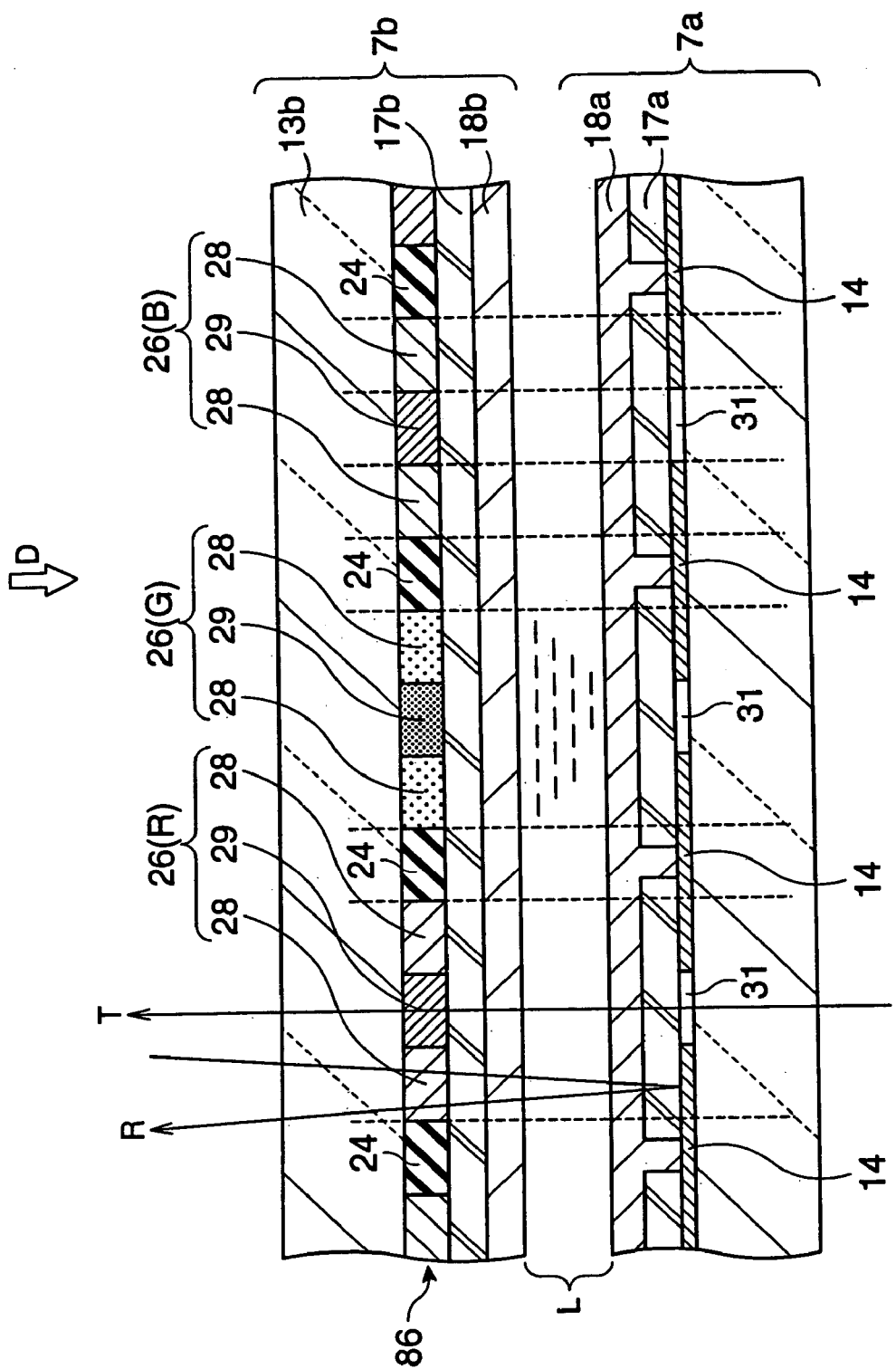
FIG. 5 is an enlarged schematic of the section indicated by the arrow V in FIG. 4, which shows another embodiment of a color filter of the present invention.

FIG. 4 shows another embodiment of a liquid crystal device of the present invention. FIG. 5 shows a color filter which constitutes the liquid crystal device shown in FIG. 4 and which is another embodiment of a color filter of the present invention. A liquid crystal device 81 shown in FIG. 4 may be constructed so as to have the same external appearance as that of the liquid crystal device 1 shown in FIG. 1. In FIG. 4, the same reference numerals are used for the same elements as those in the embodiment shown in FIG. 1.

Referring to FIG. 4, a reflective layer 14 provided with openings 31 corresponding to the individual dot regions is formed on the liquid crystal side (the upper surface shown in FIG. 4) of a base 13a constituting a first substrate 7a. First electrodes 17a are formed on the reflective layer 14, and an alignment film 18a is formed further thereon. A color filter 86 is formed on the liquid crystal side (the lower surface shown in FIG. 4) of a second substrate 7b facing the first substrate 7a. Second electrodes 17b are formed on the color filter 86, and an alignment film 18b is formed further thereon.

In the first embodiment shown in FIG. 1, both the reflective layer 14 and the color filter 16 are provided on the first substrate 7a. In contrast, in this embodiment shown in FIG. 4, the reflective layer 14 is provided on the first substrate 7a and the color filter 86 is provided on the second substrate 7b which is a counter substrate.

FIG. 5 is an enlarged schematic of the section indicated by the arrow V in FIG. 4. As shown in FIG. 5, the color filter 86 includes a bank 24 to delimit a plurality of dot regions, i.e., color-film-forming regions, and color films 26 formed in the dot regions. As for the color film 26, one pixel includes from three units displaying each additive primary colors, red (R), green (G), blue (B).

Each color film 26 includes a first film 28 which is formed like a frame, i.e., annularly, when viewed from the D direction shown in FIG. 5, in the periphery of the dot region, and a second film 29 which is square when viewed from the D direction and which is adjacent to the first film 28. Additionally, the inner circumferential surface of the first film 28 and the outer circumferential surface of the second film 29 are brought into close contact with each other without leakage of light. When the first film 28 is formed by photolithography and the second film 29 is formed by the ink-jet method, preferably, the first film 28 is formed of a material having ink-repellency with respect to a material for the second film 29. Consequently, the material for the second film 29 ejected by the ink-jet method can smoothly flow in the region surrounded by the first film 28.

The reflective layer 14 formed on the first substrate 7a facing the color filter 86 is provided with the openings 31 corresponding to the individual dot regions delimited by the bank 24 on the counter side. The second films 29 are formed at the positions corresponding to the openings 31. Therefore the first film 28, which encircles the second film 29, is provided at the opposing position to the reflective layer In order to form the first films 28 and the second films 29, a fluid color film material is supplied to the individual dot regions and is then solidified by drying or firing. The color film material is formed by dissolving a coloring agent formed of a pigment, a dye, a natural, a natural pigment, or the like, and a binder resin in a solvent. In this embodiment, the first film 28 and the second film 29 have different compositions.

Specifically, the coloring agent contained in the film material for the first film 28 and the coloring agent contained in the film material for the second film 29 have the same hue, and the coloring agent quantity in the first film 28 is lower than the coloring agent quantity in the second film 29. Thereby, although the first film 28 and the second film 29 have the same hue, the light density of the first film 28 is lower than that of the second film 29.

Referring to FIG. 5, external light, such as sunlight, received from the viewer's side (upper side in FIG. 5) through the second substrate 7b is reflected by the reflective layer 14 as indicated by symbol R and travels upward through the liquid crystal layer L. At this stage, reflected light R makes a round trip through the color film 26, and in particular, the first film 28. On the other hand, after passing through the liquid crystal layer L, transmitted light T which is transmitted through the opening 31 passes through the color film 26, and in particular, the second film 29, once.

The reflected light R passes through the first film twice, which is the low light density area in the color film 26, and the transmitted light T passes through the second film 29 once, which is the high light density area in the color film 26. As a result, although the reflected light R passed through the color film 26 twice and the transmitted light T passes through the color film 26 only once, the color appearance, such as chroma and value, by the reflected light R and the color appearance by the transmitted light T are substantially the same or are brought close to each other. In some cases, the color appearance by the reflected light R may be intentionally set so as to differ from the color appearance by the transmitted light T.

THIRD EMBODIMENT OF METHOD FOR MAKING COLOR FILTER

Figure 10:
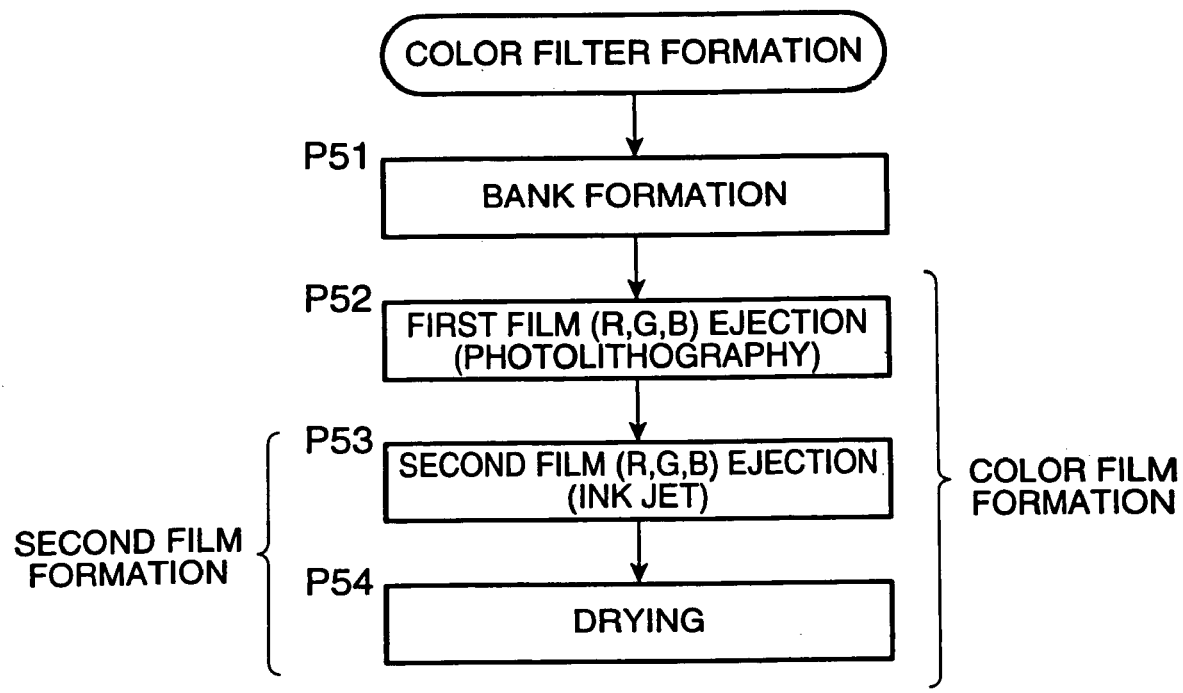
FIG. 10 is a flowchart which shows another embodiment of a method for making a color filter of the present invention.

FIG. 10 is a flowchart which shows another embodiment of a method to make a color filter of the present invention, and more particularly, a method suitable to make the color filter shown in FIG. 5. In this method, in step P51, the bank 24 is formed in a predetermined pattern, for example, in a grid pattern, by a film-forming method, such as spin-coating, and a patterning method, such as photolithography, and thus dot regions arrayed in a matrix, i.e., color-film-forming regions, are formed. The bank 24 may be formed using a black resin so as to function as a black mask.

Next, in step P52, first color films 28 of R, G, and B are formed by a film-forming method, such as spin-coating and a patterning method, such as photolithography, for example, using a material having a low light density. Preferably, the first film 28 is composed of a material having ink-repellency with respect to the second film 29. The ink-repellent material does not easily adhere to the second film 29, that is, repels the second film 29.

Next, in step P53, the second films 29 for R, G, and B are formed by the ink-jet method using a material with a different property from that of the first films 28, for example, a material having a high light density. At this stage, if the first films 28 are formed using the ink-repellent material, it is possible to flow, i.e., to spread, the second films 29 supplied by the ink-jet method uniformly within the individual dot regions. As the ink-jet method, the ink-jet method which has been described above may be used. In step P54, the second films 29 are dried. Each color film 26 in which the first film 28 and the second film 29 are adjacent to each other is thereby formed.

In the method for making the color filter film in this embodiment, since the second films 29 are formed by the ink-jet method, the color films 26 can be formed rapidly with high accuracy. Additionally, both the first films 28 and the second films 29 in the color films 26 shown in FIG. 5 may be formed by the ink-jet method.

EMBODIMENTS OF ELECTRONIC APPARATUSES

Figure 15:
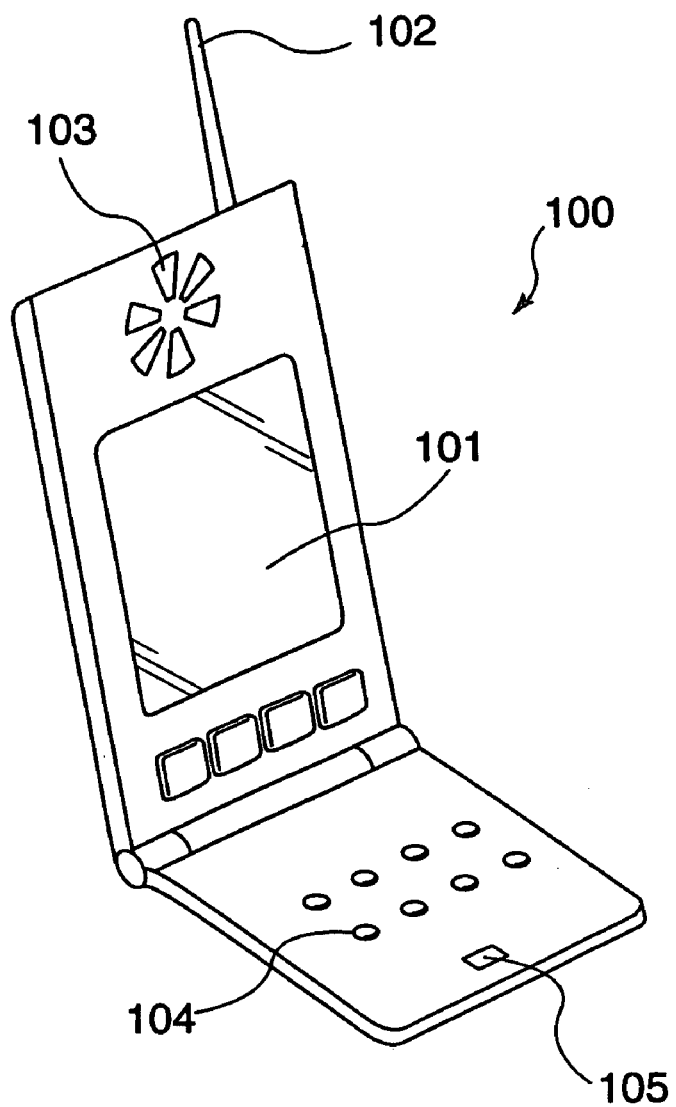
FIG. 15 is a perspective view showing a mobile phone which is an example of an electronic apparatus of the present invention.

FIG. 15 shows an embodiment of a mobile phone which is an example of an electronic apparatus of the present invention. A mobile phone 100 includes a liquid crystal device 101 as the display section, an antenna 102, a speaker 103, a key switch group 104, and a microphone 105.

The liquid crystal device 101 is contained in a case and is controlled by a control circuit (not shown in FIG. 15) provided inside the case to display phone communication contents, Internet information, etc. The liquid crystal device 101 may be formed of, for example, the liquid crystal device 1 shown in FIG. 1 or the liquid crystal device 81 shown in FIG. 4.

Figure 16:
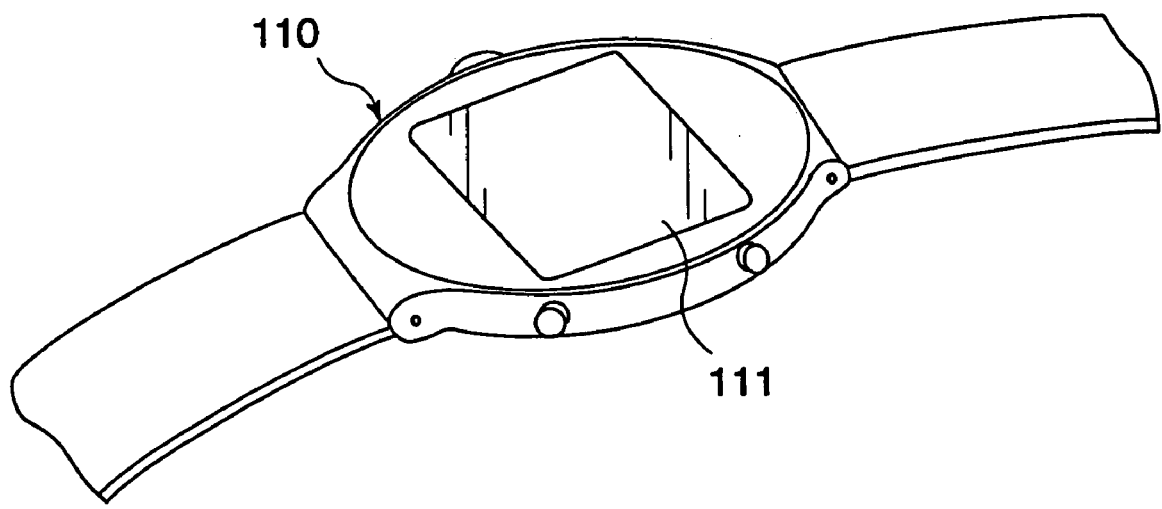
FIG. 16 is a perspective view showing a wristwatch which is another example of an electronic apparatus of the present invention.

FIG. 16 shows an embodiment of a wristwatch which is an example of an electronic apparatus of the present invention. A wristwatch 110 includes a liquid crystal device 111 as the display section. The liquid crystal device 111 is contained in a case and is controlled by a control circuit (not shown in FIG. 16) provided inside the case to display information, such as time and date. The liquid crystal device 111 may be formed of, for example, the liquid crystal device 1 shown in FIG. 1.

Figure 17:
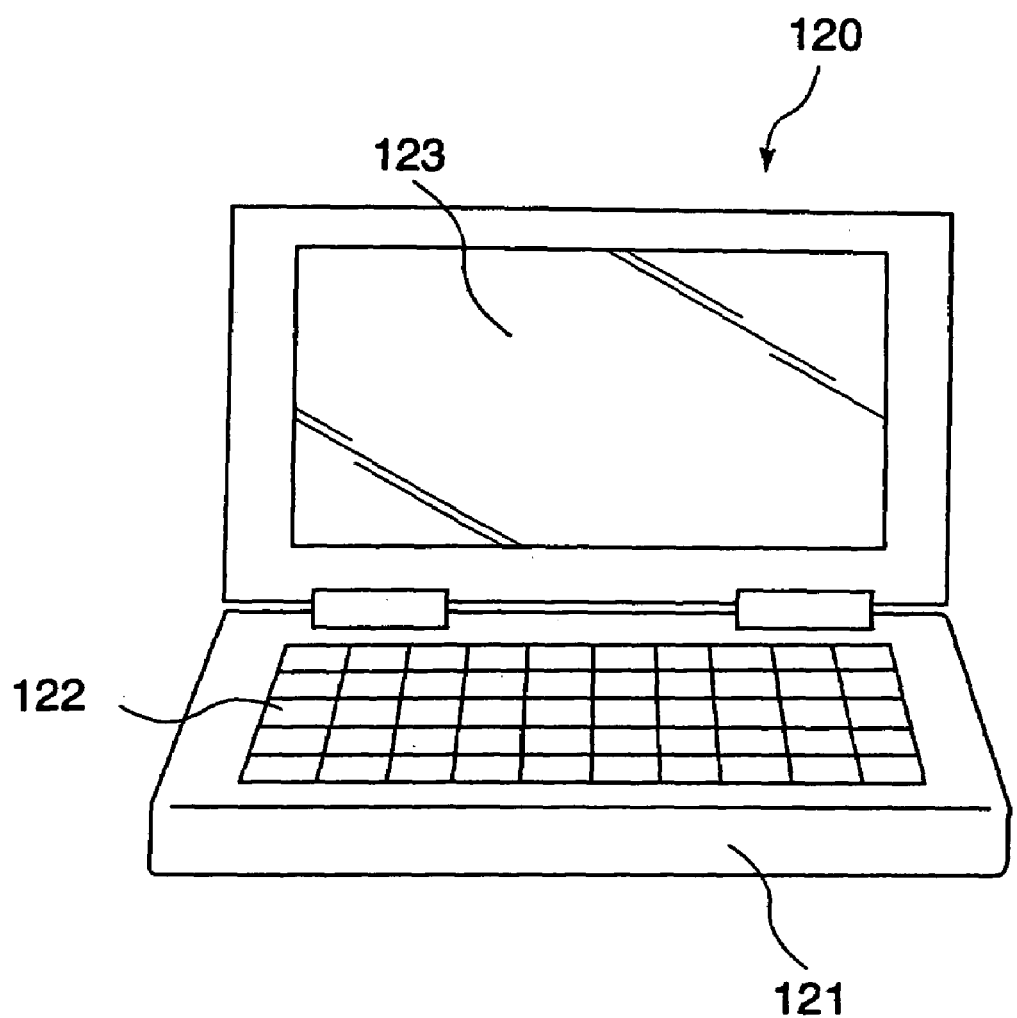
FIG. 17 is a perspective view showing a mobile information processor which is another example of an electronic apparatus of the present invention.

FIG. 17 shows an embodiment of a mobile information processor which is an example of an electronic apparatus of the present invention. A mobile information processor 120 is provided as a word processor, a personal computer, or the like. The mobile information processor 120 includes an input unit 122, such as a keyboard, provided on the surface of a body 121, and a liquid crystal device 123 as the display section. By the processing of a processor placed inside the body 121, information input through the keyboard 122 and some computing result based on the information are displayed on the liquid crystal device 123.

OTHER EMBODIMENTS

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the claims.

For example, three primary colors, R, G, and B, have been considered for the color films formed in the dot regions which are arranged in a matrix. However, the color films are not limited to R, G, and B, and subtractive primary colors, cyan (C), magenta (M), and yellow (Y) may be employed. In such a case, color film materials having colors of C, M, and Y may be used instead of the color film materials of R, G, and B.

In the embodiment shown in FIG. 11(a), the mother base 13a' is scanned with the ink-jet head 40 which is shorter than a side of the mother base 13a'. The mother base 13a' may be scanned with an ink-jet head 40 with a length substantially equal to a side of the mother base 13a'. In such a case, it is not necessary to move the ink-jet head 40 in the main scanning direction X.

In the embodiment shown in FIGS. 11(a) and 11(b), a plurality of columns of liquid-crystal-panel-forming regions 7a and 7b are placed in the mother base 13a' and 13b', respectively. The present invention is also applicable to a case in which a column of liquid-crystal-panel-forming regions 7a, etc., are placed in the mother bases 13a' and 13b'. The present invention is also applicable to a case in which only one liquid-crystal-panel-forming region 7a, etc., which has substantially the same size as that of the mother base 13a' or 13b' or which is considerably smaller than the mother base 13a' or 13b', is placed in each of the mother base 13a' and 13b'.

In the ink-jet film-forming method shown in FIG. 11(a), the base 13a' is main scanned by moving the ink-jet head 40 in the X direction, and the base 13a' is subscanned by moving the ink-jet head 40 in the Y direction. Contrary to this, the base 13a' may be main scanned by moving the ink-jet head 40 in the Y direction, and the base 13a' may be subscanned by moving the ink-jet head 40 in the X direction.

In the embodiment described above, the ink-jet head has the structure in which ink is ejected using flexure of the piezoelectric element. An ink-jet head having any other structure may also be used.

In the embodiment described above, the simple matrix liquid crystal display device is described as an example of liquid crystal devices. The present invention is also applicable to an active matrix liquid crystal device in which a two-terminal active element, such as a TFD (Thin Film Diode), is used as the switching element, an active matrix liquid crystal device in which a three-terminal active element, such as a TFT (Thin film Transistor) is used as the switching element, etc.

EFFECT OF THE INVENTION

In accordance with the color filter, the liquid crystal device, and the electronic apparatus of the present invention, the color appearance can be adjusted for each display unit, i.e., a dot region in a color display obtained by using the color filter. Therefore, the color appearance can be adjusted with high accuracy as desired.

In accordance with the method for making a color filter and the method for making a liquid crystal device of the present invention, it is possible to fabricate the color filter, the liquid crystal device, and the electronic apparatus easily and inexpensively.

What is claimed is:

1. A color filter, comprising:
  a substrate; and
  a plurality of dot-shaped color films provided on the substrate, at least one of the dot-shaped color films including a first film and a second film having different compositions, a thickness ratio of the first film to the second film changing within one dot-shaped color film, the first film and the second film being formed of a color film material including a coloring agent dissolved in a solvent, and a quantity of the coloring agent in the color film material being different between the first film and the second film so that the first film and the second film have different light densities.

2. The color filter according to claim 1, the first film having a concave shape in which the center is hollow, and the second film having a reversed convex shape in which the bottom surface is in contact with the hollow surface of the first film and the top surface is planar.

3. The color filter according to claim 1, the first film having a concave shape in which the center protrudes, and the second film having a reversed concave shape in which the bottom surface is in contact with the protruding surface of the first film and the top surface is planar.

4. The color filter according to claim 1, at least one of the first film and the second film being deposited on the substrate by an ink-jet method.

5. The color filter according to claim 4, a film not deposited by the ink-jet method being deposited on the substrate by photolithography.

6. A liquid crystal device, comprising:
  liquid crystal;
  a pair of substrates sandwiching the liquid crystal;
  a circuit to drive the liquid crystal; and
  a color filter provided on one of the pair of substrates, the color filter including the color filter according to claim 1.

7. An electronic apparatus, comprising:
the liquid crystal device according to claim 6; and
a casing containing the liquid crystal device.

8. A color filter, comprising:
a substrate; and
a plurality of dot-shaped color films provided on the substrate, at least one of the dot-shaped color films including a first film and a second film having different compositions, the first film and the second film being adjacent to each other, one of the first film and the second film including a material having ink-repellency with respect to the other of the first film and the second film, the first film and the second film being formed of a color film material including a coloring agent dissolved in a solvent, and a quantity of the coloring agent in the color film material being different between the first film and the second film so that the first film and the second film have different light densities.

9. The color film according to claim 8, further comprising a reflective layer provided on the substrate or separately from the substrate, the reflective layer having openings corresponding to the respective dot-shaped color films, one of the first film and the second film being provided at a position corresponding to the opening, and the other of the first film and the second film being provided at a position corresponding to the reflective layer.

10. The color filter according to claim 8, one of the first film and the second film that is formed first being deposited on the substrate by photolithography, and the other film of the first film and the second film subsequently formed being deposited on the substrate by an ink-jet method.

11. A method for making a color filter that includes a plurality of dot-shaped color films formed on a substrate, comprising:
forming first films in color-film-forming regions on the substrate; and
forming second films on the first films, the first films and the second films having different compositions with different light densities, a thickness ratio of the first film to the second film changing within one dot-shaped film.

12. A method for making a color filter according to claim 11, further comprising forming a reflective layer provided with openings on the substrate or separately from the substrate, each opening corresponding to each dot-shaped color film, within one dot-shaped color film, a region corresponding to the opening and a region corresponding to the reflective layer having different thickness ratios of the first film to the second film.

13. The method for making a color filter according to claim 11, the first film being formed into a concave shape in which the center is hollow, and the second film being formed into a reversed convex shape in which the bottom surface is in contact with the hollow surface of the first film and the top surface is planar.

14. The method for making a color filter according to claim 11, the first film being formed into a convex shape in which the center protrudes, and the second film being formed into a reversed concave shape in which the bottom surface is in contact with the protruding surface of the first film and the top surface is planar.

15. The method for making a color filter according to claim 11, at least one of the forming the first films and the forming the second films being performed by an ink-jet method.

16. The method for making a color filter according to claim 15, a step that is not performed by the ink-jet method being performed by photolithography.

17. A method for making a liquid crystal device that includes a pair of substrates sandwiching a liquid crystal layer, a circuit to drive the liquid crystal, and a color filter provided on one of the pair of substrates, the method comprising:
forming the color filter by the method according to claim 11.

18. A method for making a color filter that includes a plurality of dot-shaped color films formed on a substrate, comprising:
forming first films in color-film-forming regions on the substrate; and
forming second films on the first films, the first films and the second films having different compositions with different light densities, the first film including a material having ink-repellency with respect to the second film.

19. The method for making a color filter according to claim 18, further comprising forming a reflective layer provided with openings on the substrate or separately from the substrate, each opening corresponding to each dot-shaped color film, within one dot-shaped color film, one of the first film and the second film being provided at a position corresponding to the opening, and the other of the first film and the second film is provided at a position corresponding to the reflective layer.

20. The method for making a color filter according to claim 18, the forming the first film being performed by photolithography, and the forming the second film being performed by an ink-jet method.

* * * * *